(12) United States Patent
Xu

(10) Patent No.: US 11,895,494 B2
(45) Date of Patent: Feb. 6, 2024

(54) DEVICE NETWORK CONFIGURATION AND REGISTRATION METHOD, DEVICE, AND SYSTEM

(71) Applicant: HUAWEI TECHNOLOGIES CO., LTD., Guangdong (CN)

(72) Inventor: Tianliang Xu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 30 days.

(21) Appl. No.: 17/631,053

(22) Filed: Jan. 28, 2022

(65) Prior Publication Data

US 2022/0167164 A1 May 26, 2022

Related U.S. Application Data

(63) Continuation of application No. PCT/CN2020/105279, filed on Jul. 28, 2020.

(30) Foreign Application Priority Data

Jul. 31, 2019 (CN) .......................... 201910699562.2

(51) Int. Cl.
*H04W 12/06* (2021.01)
*H04W 12/0431* (2021.01)
*H04W 60/04* (2009.01)

(52) U.S. Cl.
CPC ..... *H04W 12/068* (2021.01); *H04W 12/0431* (2021.01); *H04W 60/04* (2013.01)

(58) Field of Classification Search
CPC ............. H04L 12/2809; H04L 12/2829; H04L 12/2832; H04L 63/0823; H04L 63/0876;
(Continued)

(56) References Cited

U.S. PATENT DOCUMENTS 8,316,434 B2 * 11/2012 Muhamed ............. H04W 28/16
713/153
9,232,410 B2 * 1/2016 Syu ........................ H04W 24/02
(Continued)

FOREIGN PATENT DOCUMENTS

CN 106161003 A 11/2016
CN 106302415 A 1/2017
(Continued)

OTHER PUBLICATIONS

Office Action issued in CN201910699562.2, dated Apr. 9, 2020, 8 pages.
(Continued)

*Primary Examiner* — Lizbeth Torres-Diaz

(57) ABSTRACT

A method and a device for device network configuration and registration are disclosed. The method includes: a first device receives a first network configuration parameter from a second device, where the first network configuration parameter includes a local area network identifier of a local area network, an access password of the local area network, and a device identifier, a security parameter, or an access token of the second device. The first device requests to access a server by using the first network configuration parameter. The server assigns a device parameter to the first device, where the device parameter includes a device identifier, a security parameter, and an access token of the first device. The first device requests to access the server by using the device parameter. This method can simplify a network configuration and registration process of a smart device, and implement fast network configuration and registration.

20 Claims, 18 Drawing Sheets

(58) Field of Classification Search
CPC . H04L 12/2807; H04L 41/0803; H04L 63/08; H04L 12/2803; H04W 12/068; H04W 12/0431; H04W 60/04; H04W 12/06; H04W 12/50; H04W 12/08; H04W 76/15; H04W 12/37; G06F 21/44
See application file for complete search history.

(56) References Cited

U.S. PATENT DOCUMENTS

| | | | |
|---|---|---|---|
| 9,602,279 B1* | 3/2017 | Tran | H04L 9/0866 |
| 9,820,314 B2* | 11/2017 | Sidhu | H04W 76/14 |
| 9,998,437 B2* | 6/2018 | Kim | H04L 63/0876 |
| 10,477,463 B2* | 11/2019 | Roskind | H04W 12/069 |
| 10,805,291 B2* | 10/2020 | Lee | H04L 41/0873 |
| 11,233,696 B1* | 1/2022 | Kumar | H04L 41/0803 |
| 11,336,511 B2* | 5/2022 | Johnson | H04W 12/06 |
| 11,368,453 B2* | 6/2022 | Xie | H04L 63/0428 |
| 11,431,754 B2* | 8/2022 | Ojha | H04L 63/0876 |
| 2007/0036359 A1* | 2/2007 | Suzuki | H04L 63/0823 380/270 |
| 2012/0008529 A1* | 1/2012 | Averbuch | H04L 41/12 370/255 |
| 2013/0318343 A1* | 11/2013 | Bjarnason | H04L 41/0809 713/157 |
| 2015/0038129 A1* | 2/2015 | Sundareswaran | H04L 63/102 455/418 |
| 2015/0081859 A1 | 3/2015 | Xu et al. | |
| 2015/0089624 A1 | 3/2015 | Kim et al. | |
| 2018/0132290 A1 | 5/2018 | Shen | |
| 2018/0159855 A1 | 6/2018 | Ha et al. | |
| 2018/0262497 A1* | 9/2018 | Raje | G06F 9/44542 |
| 2021/0058386 A1* | 2/2021 | Peter | H04L 63/0823 |
| 2022/0247727 A1* | 8/2022 | Bai | H04W 12/08 |
| 2022/0312207 A1* | 9/2022 | Bang | H04W 4/23 |

FOREIGN PATENT DOCUMENTS

| | | |
|---|---|---|
| CN | 106332224 A | 1/2017 |
| CN | 108833238 A | 11/2018 |
| CN | 109600252 A | 4/2019 |
| CN | 109842667 A | 6/2019 |
| CN | 110601870 A | 12/2019 |
| WO | WO-2020020312 * | 1/2020 |

OTHER PUBLICATIONS

International Search Report and Written Opinion issued in PCT/CN2020/105279, dated Oct. 21, 2020, 11 pages.
Extended European Search Report issued in EP20847764.6, dated Jul. 15, 2022, 9 pages.

* cited by examiner

DEVICE NETWORK CONFIGURATION AND REGISTRATION METHOD, DEVICE, AND SYSTEM

CROSS-REFERENCE TO RELATED APPLICATIONS

This application is a continuation of International Application No. PCT/CN2020/105279, filed on Jul. 28, 2020, which claims priority to Chinese Patent Application No. 201910699562.2, filed on Jul. 31, 2019. The disclosures of the aforementioned applications are hereby incorporated by reference in their entireties.

TECHNICAL FIELD

This application relates to the field of communications technologies, and in particular, to a method, a device, and a system for device network configuration and registration.

BACKGROUND

A smart device is an electronic device with artificial intelligence. A user may order a song, shop online, or view a weather forecast through the smart device, and may further control another smart device through the smart device. For example, the user may open a curtain, set a temperature in a refrigerator, and make a water heater to heat up in advance through voice interaction with a smart speaker, that is, control devices such as the curtain, the refrigerator, and the water heater through the smart speaker.

As technologies continuously develop, smart devices become increasingly popular. Places such as homes and hotels are configured with smart home systems. A smart home system may use a house as a platform to integrate smart devices related to home life for controlling over a wireless local area network such as a wireless fidelity (Wi-Fi) network, to improve home security, convenience, and comfort. As shown in FIG. 1, a plurality of smart devices may access a wireless local area network through home routers, and further access a smart home cloud. The smart home cloud may control and manage the accessed smart devices.

Before the smart device accesses the smart home cloud and receives a service from the smart home cloud, network configuration and registration need to be first performed on the smart device. Currently, a network configuration and registration process of the smart device is complex, and network configuration and registration need to be performed on the smart devices one by one. A process of configuring the smart home system by the user is complex. In particular, it takes a long time to configure a large batch of smart devices at the places such as the hotel. Consequently, user experience is poor.

SUMMARY

Embodiments of this application provide a method, a device, and a system for device network configuration and registration, to simplify a network configuration and registration process of a smart device. In addition, batch network configuration and registration is supported, to implement fast network configuration and registration of the smart device.

According to a first aspect, an embodiment of this application provides a device network configuration and registration method. The method may include: A first device receives a first network configuration parameter from a second device, where the first network configuration parameter includes a local area network identifier of a local area network, an access password of the local area network, a device identifier of the second device, a security parameter of the second device, and an access token of the second device. The first device accesses, by using the access password of the local area network, the local area network indicated by the local area network identifier, and requests to access a server by using the first network configuration parameter. The first device receives a device parameter assigned by the server, where the device parameter includes a device identifier of the first device, a security parameter of the first device, and an access token of the first device. The first device requests to access the server by using the device parameter.

In this method, a smart device that does not access the server can request to access the server by using a network configuration parameter of a smart device that accesses the server, and no manual configuration needs to be performed by a user. This can simplify a network configuration and registration process of the smart device, and implement fast network configuration and registration.

With reference to the first aspect, in an example embodiment, before the first device receives the first network configuration parameter from the second device, the first device performs trust chain verification with the second device. To be specific, smart devices on which trust chain verification succeeds belong to a same trust chain, and the smart devices that belong to the same trust chain can share a network configuration parameter.

With reference to the first aspect, in an example embodiment, the first device sends a public key infrastructure (PM) device certificate of the first device to the second device, so that the second device performs trust chain verification on the first device. The first device receives a PM device certificate of the second device. The first device performs trust chain verification on the second device by authenticating the PM device certificate of the second device.

With reference to the first aspect, in an example embodiment, before the first device performs trust chain verification with the second device, the first device establishes a connection to the second device. This connection is a secure channel, and is used for secure trust chain verification between the smart devices.

With reference to the first aspect, in an example embodiment, the first device sends a first request message to the server, to request to access the server. The first request message includes the first network configuration parameter.

With reference to the first aspect, in an example embodiment, the first request message further includes clone indication information, to indicate that the first device requests to access the server for the first time. In this way, the server may identify that the network configuration parameter used by the smart device is a network configuration parameter of an accessed smart device, and may reassign a device parameter to the smart device.

With reference to the first aspect, in an example embodiment, the local area network identifier is an identifier of a local area network that the second device accesses, and the access password of the local area network is an access password of the local area network that the second device accesses. In other words, the first device and the second device access the same local area network.

With reference to the first aspect, in an example embodiment, the second device is a device that accesses the server.

According to a second aspect, an embodiment of this application provides a device network configuration and registration method. The method may include: A second device obtains a first network configuration parameter, where the first network configuration parameter includes a local area network identifier of a local area network, an access password of the local area network, a device identifier of the second device, a security parameter of the second device, and an access token of the second device. The second device sends the first network configuration parameter to a first device.

In this method, a smart device that accesses a server sends a network configuration parameter of the smart device to a smart device that does not access the server. In this way, the smart device that does not access the server can request to access the server by using the network configuration parameter of the smart device that accesses the server, and no manual configuration needs to be performed by a user. This can simplify a network configuration and registration process of the smart device, and implement fast network configuration and registration.

With reference to the second aspect, in an example embodiment, before the second device sends the first network configuration parameter to the first device, the second device performs trust chain verification with the first device. To be specific, smart devices on which trust chain verification succeeds belong to a same trust chain, and the smart devices that belong to the same trust chain can share a network configuration parameter.

With reference to the second aspect, in an example embodiment, the second device receives a public key infrastructure (PKI) device certificate of the first device, and performs trust chain verification on the first device by authenticating the PKI device certificate of the first device; and further sends a PKI device certificate of the second device to the first device, so that the first device performs trust chain verification on the smart device.

With reference to the second aspect, in an example embodiment, before the second device performs trust chain verification with the first device, the second device establishes a connection to the first device. This connection is a secure channel, and is used for secure trust chain verification between the smart devices.

With reference to the second aspect, in an example embodiment, before the second device performs trust chain verification with the first device, the second device receives an operation of confirming to perform network configuration and registration on the first device by the user. In other words, the user can authorize to perform network configuration and registration on one or more first devices by using the network configuration and registration method provided in this embodiment of this application.

With reference to the second aspect, in an example embodiment, the local area network identifier is an identifier of a local area network that the second device accesses, and the access password of the local area network is an access password of the local area network that the second device accesses. In other words, the first device and the second device access the same local area network.

With reference to the second aspect, in an example embodiment, before the second device obtains the first network configuration parameter, the second device accesses the local area network indicated by the local area network identifier.

According to a third aspect, an embodiment of this application provides a device network configuration and registration method. The method may include: A server receives a first request message from a first device. The first request message is used to request to access the server, and includes a first network configuration parameter and clone indication information. The first network configuration parameter includes a device identifier of a second device, a security parameter of the second device, and an access token of the second device, and the clone indication information is used to indicate that the first device requests to access the server for the first time. The server sends a device parameter to the first device, where the device parameter includes a device identifier of the first device, a security parameter of the first device, and an access token of the first device.

In this method, a smart device that does not access the server requests to access the server by using a network configuration parameter of a smart device that accesses the server. The server reassigns a device parameter to the smart device that does not access the server, and the smart device that does not access the server can access the server by using the newly assigned device parameter. In this way, a user does not need to manually configure a network configuration and registration process of the smart device, so that the network configuration and registration process of the smart device is simplified, and fast network configuration and registration is implemented.

According to a fourth aspect, an embodiment of this application provides a device network configuration and registration method. The method may include: A first device receives an operation of confirming to perform network configuration and registration on one or more second devices by a user. The first device is a device that accesses a server, and the second device is a device that does not access the server. The first device separately performs trust chain verification with the one or more second devices in response to the operation of confirming to perform network configuration and registration on the one or more second devices by the user. Then, the first device separately sends a first network configuration parameter to the one or more second devices. The first network configuration parameter includes a local area network identifier of a local area network, an access password of the local area network, a device identifier of the first device, a security parameter of the first device, and an access token of the first device. The one or more second devices receive the first network configuration parameter, and access, by using the access password of the local area network, the local area network indicated by the local area network identifier, where the local area network indicated by the local area network identifier is the local area network that the first device accesses. The one or more second devices separately request to access the server by using the first network configuration parameter. The server separately sends, to each second device, a device parameter that corresponds to the second device and that is assigned by the server, where the device parameter includes a device identifier of the second device, a security parameter of the second device, and an access token of the second device. The one or more second devices separately receive the corresponding device parameters, and request to access the server by using the corresponding device parameters.

In this method, smart devices in a same trust chain can share a network configuration parameter. To be specific, a smart device that does not access the server requests to access the server by using a network configuration parameter of a smart device that accesses the server. The server reassigns a device parameter to the smart device that does not access the server, and the smart device that does not access the server can access the server by using the newly assigned device parameter. In this way, the user does not need to manually configure a network configuration and registration process of the smart device, so that the network configuration and registration process of the smart device is simplified, and fast network configuration and registration is implemented.

According to a fifth aspect, an embodiment of this application provides an electronic device. The electronic device may implement the device network configuration and registration method according to the first aspect, the second aspect, or the third aspect and the example embodiments of the first aspect, the second aspect, or the third aspect. The electronic device may implement the method by using software, hardware, or hardware executing corresponding software. In an example embodiment, the electronic device may include a processor and a memory.

The processor is configured to support the electronic device in performing a corresponding function in the method in the first aspect, the second aspect, or the third aspect. The memory is configured to be coupled to the processor, and store program instructions and data that are necessary for the electronic device.

According to a sixth aspect, an embodiment of this application provides a computer storage medium. The computer storage medium includes computer instructions, and when the computer instructions are run on an electronic device, the electronic device is enabled to perform the device network configuration and registration method according to the first aspect, the second aspect, or the third aspect and the example embodiments of the first aspect, the second aspect, or the third aspect.

According to a seventh aspect, an embodiment of this application provides a computer program product. When the computer program product runs on a computer, the computer is enabled to perform the device network configuration and registration method according to the first aspect, the second aspect, or the third aspect and the example embodiments of the first aspect, the second aspect, or the third aspect.

According to an eighth aspect, an embodiment of this application provides a smart home system. The smart home system may include a first device, one or more second devices, and a server. The first device is a device that accesses the server, and the second device is a device that does not access the server. The first device is configured to: receive an operation of confirming to perform network configuration and registration on the one or more second devices by a user; and perform trust chain verification with the one or more second devices in response to the operation of confirming to perform network configuration and registration on the one or more second devices by the user. The second device is configured to perform trust chain verification with the first device. The first device is further configured to separately send a first network configuration parameter to the one or more second devices. The first network configuration parameter includes a local area network identifier of a local area network, an access password of the local area network, a device identifier of the first device, a security parameter of the first device, and an access token of the first device. The second device is further configured to receive the first network configuration parameter, and access, by using the access password of the local area network, the local area network indicated by the local area network identifier. The local area network indicated by the local area network identifier is a local area network that the first device accesses. The second device is further configured to request to access the server by using the first network configuration parameter. The server is configured to send, to each second device, a device parameter that corresponds to the second device and that is assigned by the server. The device parameter includes a device identifier of the second device, a security parameter of the second device, and an access token of the second device. The second device is further configured to receive the device parameter corresponding to the second device, and request to access the server by using the corresponding device parameter.

For technical effects brought by the electronic device according to the fifth aspect, the computer storage medium according to the sixth aspect, the computer program product according to the seventh aspect, and the smart home system according to the eighth aspect, refer to technical effects brought by the foregoing corresponding methods.

DESCRIPTION OF EMBODIMENTS

The following specifically describes, with reference to the accompanying drawings, the device network configuration and registration method provided in the embodiments of this application.

Figure 1:
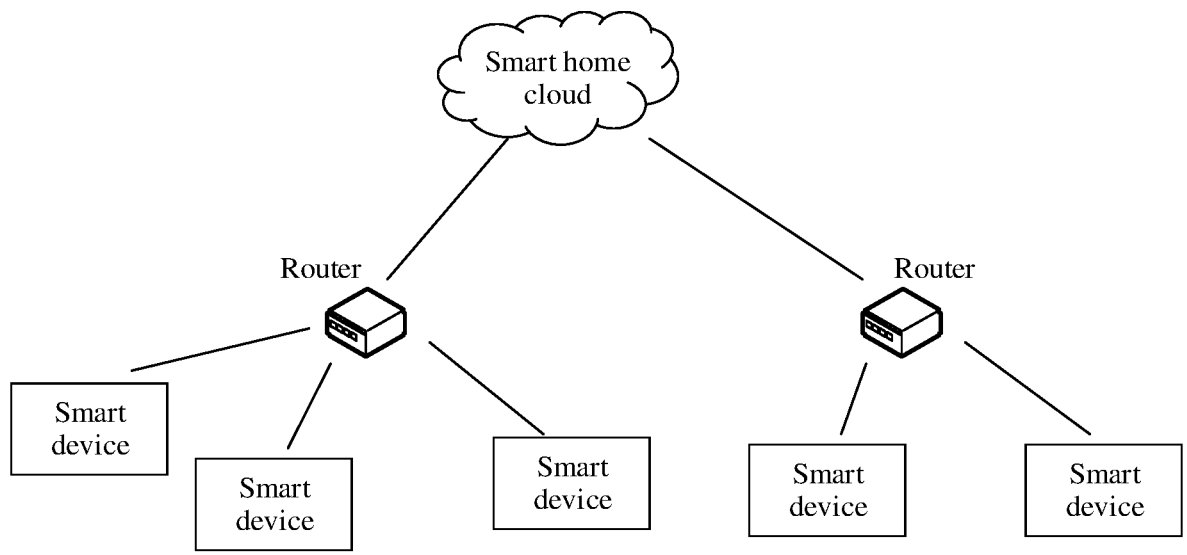
FIG. 1 is a schematic diagram 1 of a system architecture to which a device network configuration and registration method is applicable according to an embodiment of this application.
Figure 2:
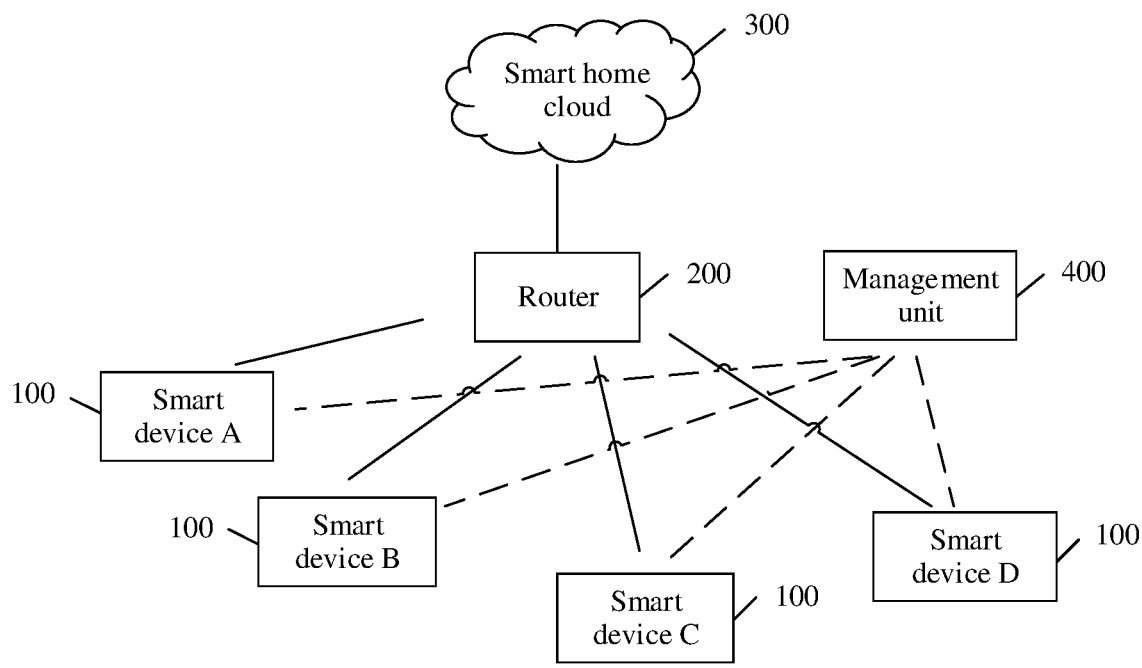
FIG. 2 is a schematic diagram 2 of a system architecture to which a device network configuration and registration method is applicable according to an embodiment of this application.

The device network configuration and registration method provided in the embodiments of this application may be applied to an example system shown in FIG. 2. The system may include one or more devices 100, a router 200, a smart home cloud 300, and a management unit 400.

The device 100 may be a smart home device (for example, a smart television, a smart refrigerator, a smart washing machine, a smart speaker, a smart rice cooker, or a smart chandelier), a portable computer (for example, a mobile phone), a notebook computer, a personal computer (PC), a wearable electronic device (for example, a smart watch, smart glasses, or a smart helmet), a tablet computer, an augmented reality (AR)/virtual reality (VR) device, a vehicle-mounted computer, or the like. A specific form of the device 100 is not specifically limited in the embodiments of this application. The device 100 may also be referred to as a smart device 100 in the embodiments of this application.

The router 200 is configured to provide an access function for the smart device 100. The smart device 100 may access a wireless local area network provided by the router 200. Each router 200 corresponds to one router identifier, and the smart device 100 may access a corresponding router 200 by using the router identifier. For example, the router identifier is a service set identifier (SSID).

The smart home cloud 300 is configured to assign a unique device identifier to the accessed smart device 100, and provide services such as device status query and remote device control command relay, for the smart device 100. The smart home cloud 300 may be a service program constructed by a smart home manufacturer on a service side, and may be a cloud server, for example, an Internet of things (IoT) server.

In some embodiments, the system may include the management unit 400, and the management unit 400 is configured to manage and configure the smart device 100. For example, a user may select a router 200 on the management unit 400, enter a password of the router 200, and trigger the smart device 100 to access the router 200. For example, the user may select, on the management unit 400, whether to perform network configuration and registration on the smart device 100. It should be noted that the management unit 400 may be a device independent of the smart device 100, or may be a module in a device independent of the smart device 100. Alternatively, the management unit 400 may be a module that manages and configures a function in the smart device 100. The management unit 400 may be a hardware device, a software module, or a combination of hardware and software. A specific form of the management unit 400 is not limited in embodiments of this application. For example, the management unit 400 may be a management application (APP). The management APP may be installed on the smart device 100 (for example, the smart speaker), or may be installed on an electronic device (for example, the mobile phone) independent of the smart device 100.

Figure 3:
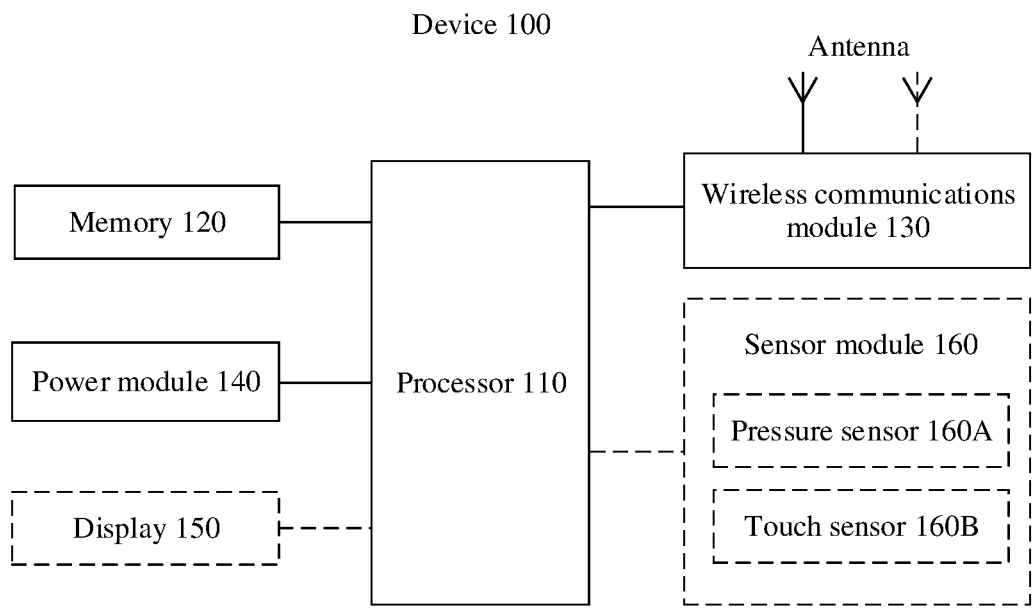
FIG. 3 is a schematic diagram of a structure of a smart device to which a device network configuration and registration method is applicable according to an embodiment of this application.

FIG. 3 is a schematic diagram of a structure of the smart device 100 according to an embodiment of this application. The smart device 100 may include a processor 110, a memory 120, a wireless communications module 130, a power module 140, and the like.

It may be understood that the structure shown in this embodiment of the present invention constitutes no specific limitation on the smart device 100. In some other embodiments of this application, the smart device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processors. For example, the processor 110 may include an application processor, a controller, a digital signal processor (DSP), or the like. Different processors may be independent components, or may be integrated into one or more processors.

The controller may be a nerve center and a command center of the smart device 100. The controller may generate an operation control signal based on an instruction operation code and a time sequence signal, to complete control of instruction fetching and instruction execution.

An operating system of the smart device 100 may be installed on the application processor, and is configured to manage hardware and software resources of the smart device 100, for example, manage and configure memory, prioritize supply and demand of system resources, control input and output devices, operate a network, manage a file system, and managing a driver. The operating system may also be configured to provide an operating interface for a user to interact with the system. Various types of software, such as a driver and an application (APP), may be installed in the operating system.

The memory 120 is configured to store instructions and data. In some embodiments, the memory 120 is a cache memory. The memory may store instructions or data used or cyclically used by the processor 110. If the processor 110 needs to use the instructions or the data again, the processor 110 may directly invoke the instructions or the data from the memory 120. This avoids repeated access and reduces a waiting time of the processor 110, thereby improving system efficiency.

The memory 120 may further store an identifier used to uniquely identify the smart device 100 (for example, a device identifier assigned by the smart home cloud 300 to the accessed smart device 100), and store an identifier of another device (for example, a router).

In some embodiments, the memory 120 may alternatively be disposed in the processor 110. In other words, the processor 110 includes the memory 120. This is not limited in embodiments of this application.

The wireless communications module 130 may provide a solution that is applied to the smart device 100 and that includes wireless communication such as a wireless local area network (WLAN) (for example, a wireless fidelity (Wi-Fi) network), Bluetooth (BT), a global navigation satellite system (GNSS), frequency modulation (FM), NFC, an infrared (IR) technology, and ZigBee. For example, the wireless communications module 130 may be configured to implement communication between the smart device 100 and the router 200 in this embodiment, and may further be configured to implement communication between the smart device 100 and another smart device 100 in this embodiment. The wireless communications module 130 may be one or more components integrating at least one communications processing module. The wireless communications module 130 receives an electromagnetic wave through an antenna, performs frequency modulation and filtering processing on an electromagnetic wave signal, and sends a processed signal to the processor 110. The wireless communications module 130 may further receive a to-be-sent signal from the processor 110, perform frequency modulation and amplification on the signal, and convert a processed signal into an electromagnetic wave for radiation through the antenna.

The power module 140 may be configured to supply power to each component included in the smart device 100. In some embodiments, the power module 140 may be a battery, for example, a rechargeable battery.

In some embodiments, the smart device 100 may further include a display 150 and a sensor module 160. The sensor module 160 may include a pressure sensor 160A, a touch sensor 160B, and the like. In this application, when the smart device 100 includes the display 150 and the sensor module 160, the management unit 400 may be located in the smart device 100. The user may perform an operation on a user interface (UI) of the management unit 400 by using the display 150, to implement a function of managing and configuring the smart device.

The display 150 is configured to display an image, a video, and the like. The display 150 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, quantum dot light emitting diodes (QLED), or the like. In some embodiments, the smart device 100 may include one or N displays 150, where N is a positive integer greater than 1.

The pressure sensor 160A is configured to sense a pressure signal, and can convert the pressure signal into an electrical signal. In some embodiments, the pressure sensor 160A may be disposed on the display 150. There are many types of pressure sensors 160A, such as a resistive pressure sensor, an inductive pressure sensor, and a capacitive pressure sensor. The capacitive pressure sensor may include at least two parallel plates made of conductive materials. When a force is applied to the pressure sensor 160A, capacitance between electrodes changes. The smart device 100 determines pressure intensity based on a capacitance change. When a touch operation is performed on the display 150, the smart device 100 detects intensity of the touch operation by using the pressure sensor 160A. The smart device 100 may also calculate a touch location based on a detection signal of the pressure sensor 160A.

The touch sensor 160B is also referred to as a "touch panel". The touch sensor 160B may be disposed on the display 150, and the touch sensor 160B and the display 150 form a touchscreen, which is also referred to as a "touch screen". The touch sensor 160B is configured to detect a touch operation performed on or near the touch sensor 160B. The touch sensor may transfer the detected touch operation to the application processor, to determine a type of a touch event. The display 150 may provide a visual output related to the touch operation. In some other embodiments, the touch sensor 160B may alternatively be disposed on a surface of the smart device 100 at a location different from that of the display 150.

Figure 4:
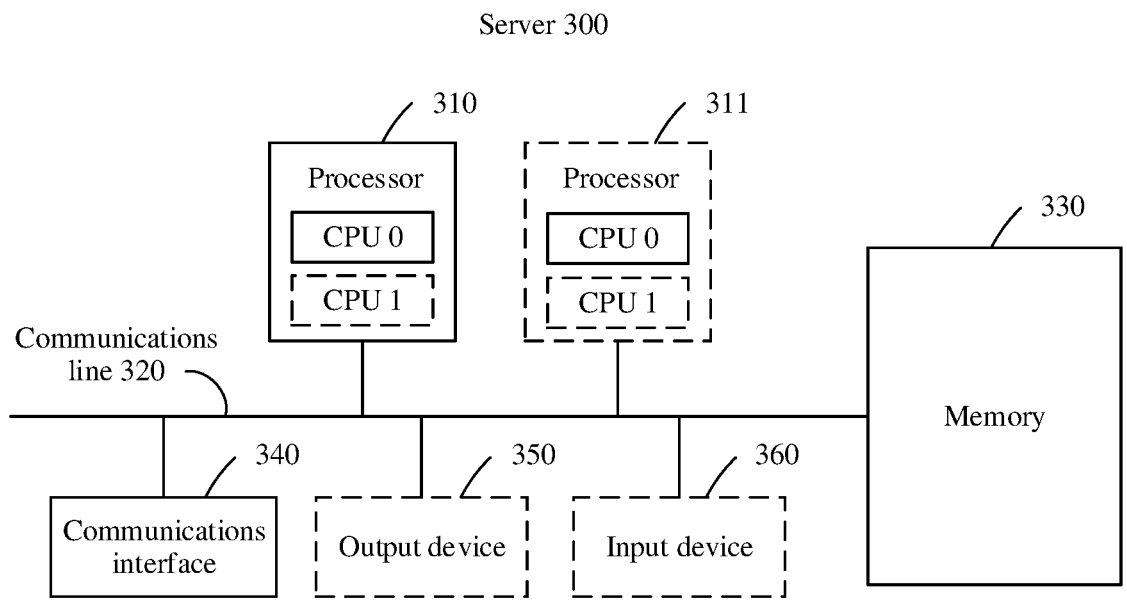
FIG. 4 is a schematic diagram of a structure of a server to which a device network configuration and registration method is applicable according to an embodiment of this application.

FIG. 4 is a schematic diagram of a structure of a server 300 (e.g., the smart home cloud 300) according to an embodiment of this application. The server 300 includes at least one processor 310, a communications line 320, a memory 330, and at least one communications interface 340.

The processor 310 may be a general-purpose central processing unit (CPU), a microprocessor, an application-specific integrated circuit (ASIC), or one or more integrated circuits configured to control program execution of the solutions in this application.

The communications line 320 may include a path for transmitting information between the foregoing components.

The communications interface 340 is any apparatus, for example, a transceiver, and is configured to communicate with another device or a communications network, for example, the Ethernet, a radio access network (RAN), or a wireless local area network (WLAN), for example, configured to communicate with the router 200 in this application.

The memory 330 may be a read-only memory (ROM) or another type of static storage device that can store static information and instructions, or a random access memory (RAM) or another type of dynamic storage device that can store information and instructions, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, and the like), a magnetic disk storage medium or another magnetic storage device, or any other medium that can be configured to carry or store expected program code in a form of an instruction or a data structure and that can be accessed by a computer. This is not limited thereto. The memory 330 may exist independently, and is connected to the processor 310 through the communications line 320. The memory 330 may alternatively be integrated with the processor 310.

The memory 330 is configured to store computer-executable instructions for executing the solutions in this application, and the processor 310 controls the execution. The processor 310 is configured to execute the computer-executable instructions stored in the memory 330, to implement the device network configuration and registration method provided in the following embodiments of this application.

Optionally, the computer-executable instructions in embodiments of this application may also be referred to as application program code. This is not specifically limited in embodiments of this application.

In an embodiment, the processor 310 may include one or more CPUs, for example, a CPU 0 and a CPU 1 in FIG. 4.

In an embodiment, the server 300 may include a plurality of processors, for example, a processor 310 and a processor 311 in FIG. 4. Each of the processors may be a single-core (single-CPU) processor or a multi-core (multi-CPU) processor. The processor herein may refer to one or more devices, circuits, and/or processing cores configured to process data (for example, computer program instructions).

In an embodiment, the server 300 may further include an output device 350 and an input device 360. The output device 350 communicates with the processor 310, and may display information in a plurality of manners. For example, the output device 350 may be a liquid crystal display (LCD), a light-emitting diode (LED) display device, a cathode ray tube (CRT) display device, a projector, or the like. The input device 360 communicates with the processor 310, and may receive a user input in a plurality of manners. For example, the input device 360 may be a mouse, a keyboard, a touchscreen device, or a sensor device.

The server 300 may be a general-purpose device or a dedicated device. In a specific implementation, the server 300 may be a desktop computer, a portable computer, a network server, a personal digital assistant (PDA), a mobile phone, a tablet computer, a wireless terminal device, an embedded device, or a device with a structure similar to that in FIG. 4. A type of the server 300 is not limited in embodiments of this application.

Figure 5:
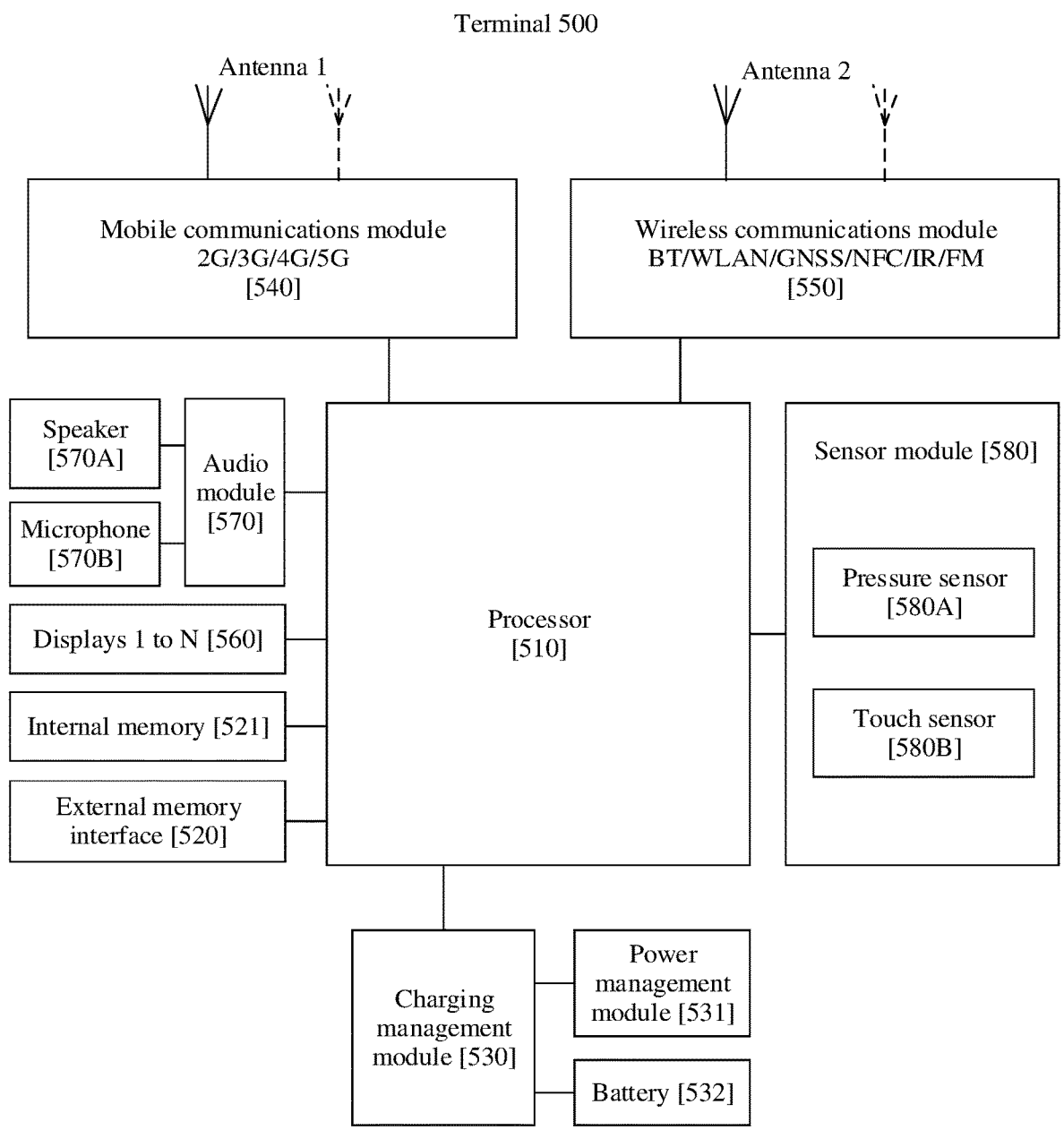
FIG. 5 is a schematic diagram of a structure of a terminal to which a device network configuration and registration method is applicable according to an embodiment of this application.
Figure 6A:
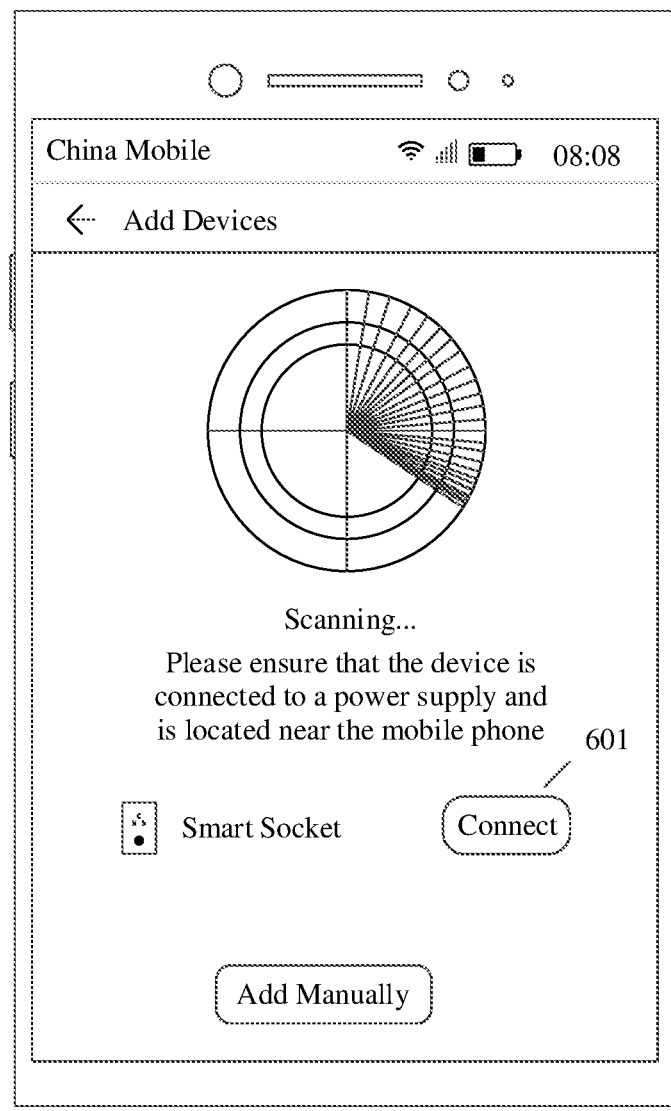
FIG. 6(a) to FIG. 6(d) are schematic diagrams 1 of a terminal display interface of a device network configuration and registration method according to an embodiment of this application.
Figure 6B:
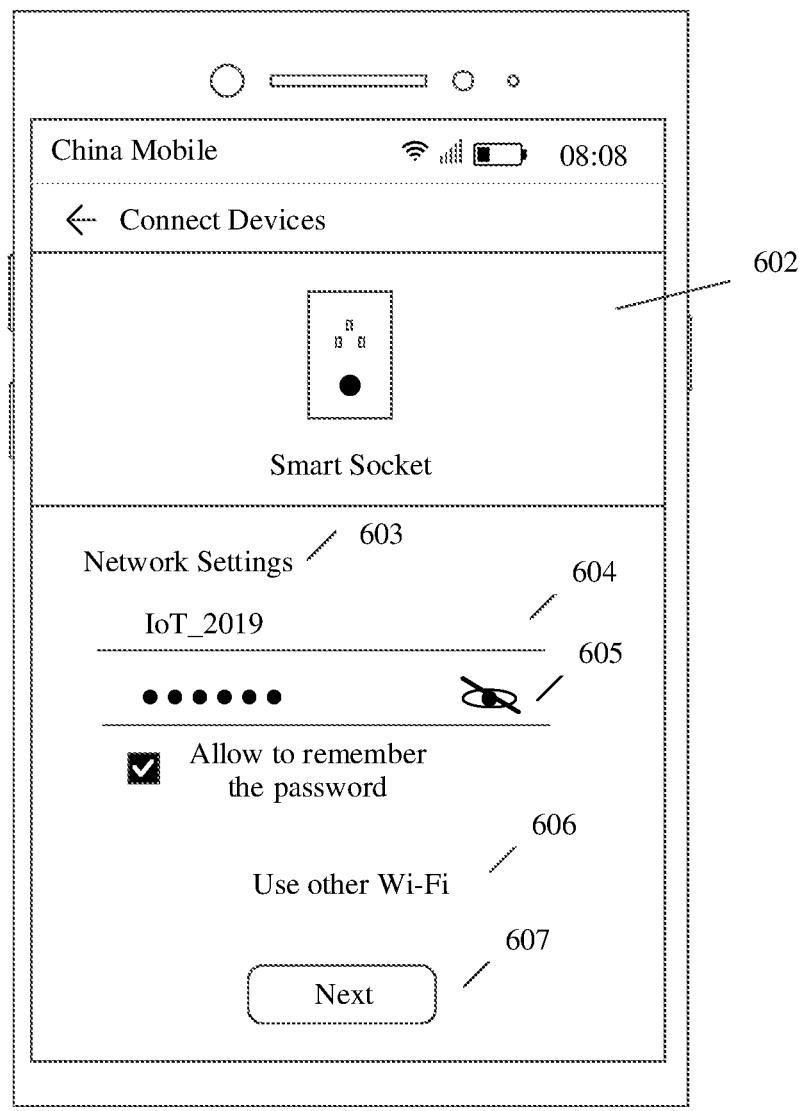
Figure 6C:
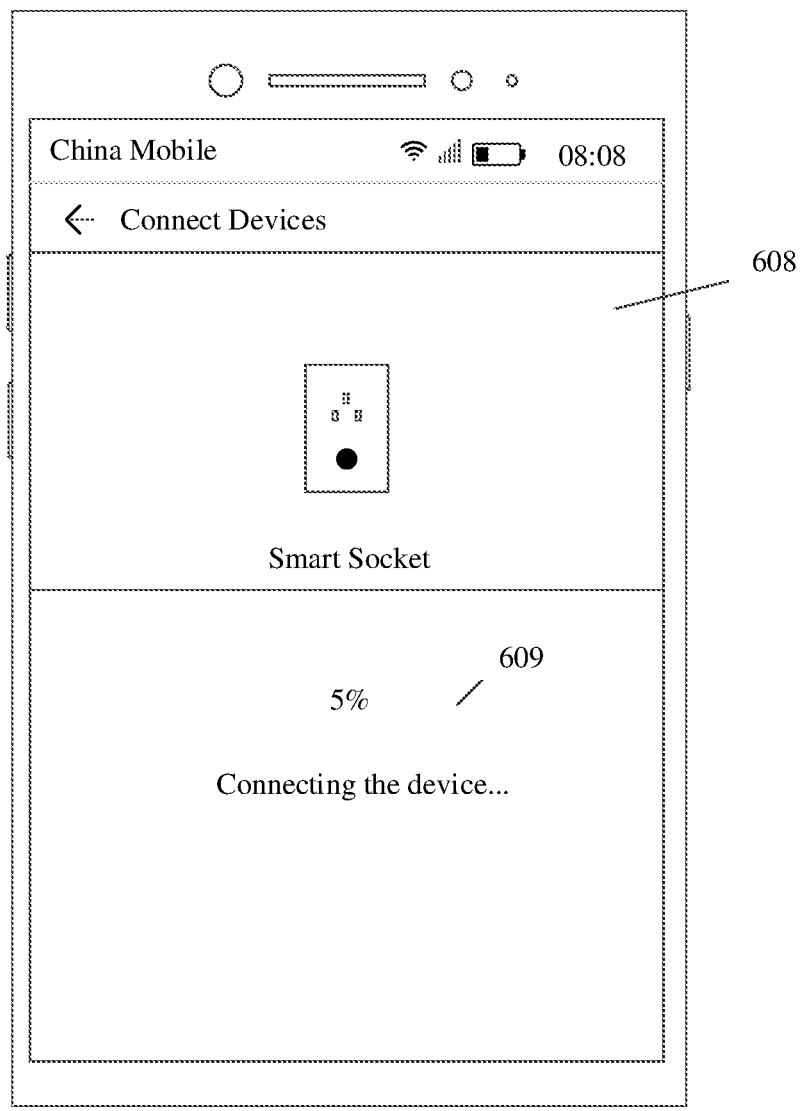
Figure 6D:
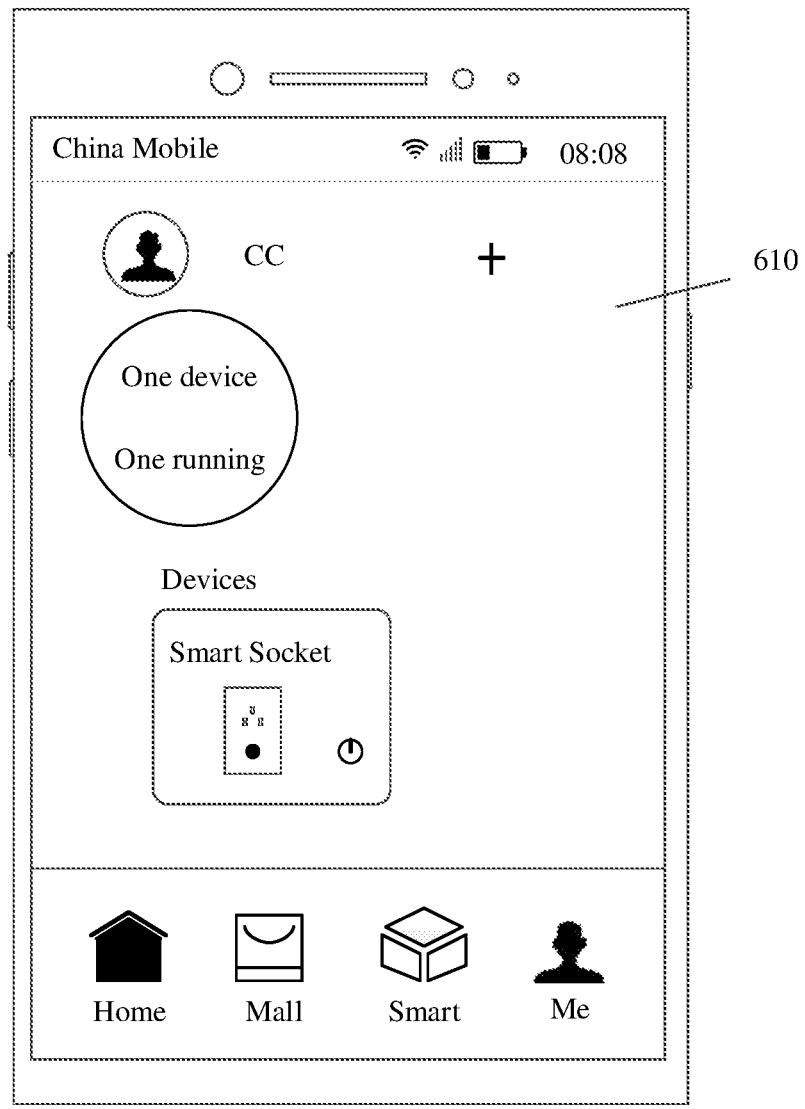

When the management unit 400 is a unit independent of the smart device 100, FIG. 5 is a schematic diagram of a structure of a terminal 500 according to an embodiment of this application. The management unit 400 is a unit running on the terminal 500. For example, the management unit 400 is a management APP on the terminal 500 (e.g., a mobile phone).

The terminal 500 may include a processor 510, an external memory interface 520, an internal memory 521, a charging management module 530, a power management module 531, a battery 532, an antenna 1, an antenna 2, a mobile communications module 540, a wireless communications module 550, a display 560, an audio module 570, a speaker 570A, a microphone 570B, a sensor module 580, and the like. The sensor module 580 may include a pressure sensor 580A, a touch sensor 580B, and the like.

It may be understood that the structure shown in this embodiment of the present invention constitutes no specific limitation on the terminal 500. In some other embodiments of this application, the terminal 500 may include more or fewer components than those shown in the figure, or some components may be combined, or some components may be split, or there may be a different component layout. The components shown in the figure may be implemented by hardware, software, or a combination of software and hardware.

The processor 510 may include one or more processors. For example, the processor 510 may include an application processor, a modem processor, a graphics processing unit (GPU), an image signal processor (ISP), a controller, a memory, and a video codec, a digital signal processor (DSP), a baseband processor, and/or a neural-network processing unit (NPU). Different processors may be independent components, or may be integrated into one or more processors.

The controller may be a nerve center and a command center of the terminal 500. The controller may generate an operation control signal based on an instruction operation code and a time sequence signal, to complete control of instruction fetching and instruction execution.

A memory may further be disposed in the processor 510, and is configured to store instructions and data. In some embodiments, the memory in the processor 510 is a cache. The memory may store instructions or data used or cyclically used by the processor 510. If the processor 510 needs to use the instructions or the data again, the processor 510 may directly invoke the instructions or the data from the memory. This avoids repeated access and reduces a waiting time of the processor 510, thereby improving system efficiency.

For example, in this embodiment of this application, the management unit 400 may run on the processor 510 of the terminal 500.

The charging management module 530 is configured to receive a charging input from a charger. The charger may be a wireless charger or a wired charger. When charging the battery 532, the charging management module 530 may further supply power to the terminal by using the power management module 531.

The power management module 531 is configured to connect the battery 532, the charging management module 530, and the processor 510. The power management module 531 receives an input from at least one of the battery 532 and/or an input from the charging management module 530, and supplies power to the processor 510, the internal memory 521, an external memory, the display 560, the wireless communications modules 550, and the like. In some other embodiments, the power management module 531 may alternatively be disposed in the processor 510. In some other embodiments, the power management module 531 and the charging management module 530 may be alternatively disposed in a same component.

A wireless communication function of the terminal 500 may be implemented through the antenna 1, the antenna 2, the mobile communications module 540, the wireless communications module 550, the modem processor, the baseband processor, and the like.

The antenna 1 and the antenna 2 are configured to transmit and receive electromagnetic wave signals. Each antenna in the terminal 500 may be configured to cover one or more communications frequency bands. Different antennas may further be multiplexed, to improve antenna utilization. For example, the antenna 1 may be multiplexed as a diversity antenna in a wireless local area network. In some other embodiments, the antenna may be used in combination with a tuning switch.

The mobile communications module 540 may provide a solution that is applied to the terminal 500 and that includes wireless communication such as 2G, 3G, 4G, 5G, and the like. The mobile communications module 540 may receive an electromagnetic wave through the antenna 1, perform processing such as filtering and amplification on the received electromagnetic wave, and transmit a processed electromagnetic wave to the modem processor for demodulation. The mobile communications module 540 may further amplify a signal modulated by the modem processor, and convert the signal into an electromagnetic wave for radiation through the antenna 1. In some embodiments, at least some function modules of the mobile communications module 540 may be disposed in the processor 510. In some embodiments, at least some function modules of the mobile communications module 540 and at least some modules of the processor 510 may be disposed in a same component.

The wireless communications module 550 may provide a solution that is applied to the terminal 500 and that includes wireless communication such as a wireless local area network (WLAN) (for example, a wireless fidelity (Wi-Fi) network), Bluetooth (BT), a global navigation satellite system (GNSS), frequency modulation (FM), NFC, and an infrared (IR) technology. For example, the wireless communications module 550 may be configured to implement wireless communication between the management unit and the smart device 100 in the embodiments of this application. The wireless communications module 550 may be one or more components integrating at least one communications processing module. The wireless communications module 550 receives an electromagnetic wave through the antenna 2, performs frequency modulation and filtering processing on an electromagnetic wave signal, and sends a processed signal to the processor 510. The wireless communications module 550 may further receive a to-be-sent signal from the processor 510, perform frequency modulation and amplification on the signal, and convert a processed signal into an electromagnetic wave for radiation through the antenna 2.

The terminal 500 implements a display function by using the GPU, the display 560, the application processor, and the like. The GPU is a microprocessor for image processing, and is connected to the display 560 and the application processor. The GPU is configured to: perform mathematical and geometric calculation, and render an image. The processor 510 may include one or more GPUs that execute program instructions to generate or change display information.

The display 560 is configured to display an image, a video, and the like. The display 560 includes a display panel. The display panel may be a liquid crystal display (LCD), an organic light-emitting diode (OLED), an active-matrix organic light-emitting diode or active-matrix organic light-emitting diode (AMOLED), a flexible light-emitting diode (FLED), a mini-LED, a micro-LED, a micro-OLED, quantum dot light emitting diodes (QLED), or the like. In some embodiments, the terminal 500 may include one or N displays 560, where N is a positive integer greater than 1.

The external memory interface 520 may be configured to connect to an external storage card, for example, a micro SD card, to extend a storage capability of the terminal 500. The external storage card communicates with the processor 510 through the external memory interface 520, to implement a data storage function. For example, files such as music and a video are stored in the external memory card.

The internal memory 521 may be configured to store computer-executable program code. The executable program code includes instructions. The processor 510 runs the instructions stored in the internal memory 521, to perform various functions of the terminal 500 and data processing. The internal memory 521 may include a program storage area and a data storage area. The program storage area may store an operating system, an application required by at least one function (for example, a voice playing function or an image playing function), and the like. The data storage area may store data (for example, audio data or a phone book) created during use of the terminal 500, and the like. In addition, the internal memory 521 may include a high-speed random access memory, and may further include a non-volatile memory, for example, at least one magnetic disk storage component, a flash component, or a universal flash storage (UFS).

The terminal 500 may implement an audio function, for example, music playing, recording, and user voice receiving, by using the audio module 570, the speaker 570A, the microphone 570B, the application processor, and the like.

The audio module 570 is configured to convert digital audio information into an analog audio signal output, and is also configured to convert an analog audio input into a digital audio signal. The audio module 570 may further be configured to encode and decode an audio signal. In some embodiments, the audio module 570 may be disposed in the processor 510, or some function modules of the audio module 570 are disposed in the processor 510.

The speaker 570A, also referred to as a "loud speaker", is configured to convert an audio electrical signal into a sound signal. The terminal 500 may be used to listen to music, answer a hands-free call, play prompt information, or the like by using the speaker 570A.

The microphone 570B, also referred to as a "mike" or a "mic", is configured to convert a sound signal into an electrical signal. When making a call or sending voice information, a user may make a sound near the microphone 570B through the mouth of the user, to input a sound signal to the microphone 570B. At least one microphone 570B may be disposed in the terminal 500.

The pressure sensor 580A is configured to sense a pressure signal, and can convert the pressure signal into an electrical signal. In some embodiments, the pressure sensor 580A may be disposed on the display 560. There are many types of pressure sensors 580A, such as a resistive pressure sensor, an inductive pressure sensor, and a capacitive pressure sensor. The capacitive pressure sensor may include at least two parallel plates made of conductive materials. When a force is applied to the pressure sensor 580A, capacitance between electrodes changes. The terminal 500 determines pressure strength based on a capacitance change. When a touch operation is performed on the display 560, the terminal 500 detects intensity of the touch operation by using the pressure sensor 580A. The terminal 500 may also calculate a touch location based on a detection signal of the pressure sensor 580A.

The touch sensor 580B is also referred to as a "touch panel". The touch sensor 580B may be disposed on the display 560, and the touch sensor 580B and the display 560 form a touchscreen, which is also referred to as a "touch screen". The touch sensor 580B is configured to detect a touch operation performed on or near the touch sensor 580B. The touch sensor may transfer the detected touch operation to the application processor, to determine a type of a touch event. The display 560 may provide a visual output related to the touch operation. In some other embodiments, the touch sensor 580B may alternatively be disposed on a surface of the terminal 500 at a location different from that of the display 560. For example, in this embodiment of this application, the terminal 500 may receive, by using the touchscreen, an operation performed by the user on the management unit 400.

Before a smart device accesses a smart home cloud and receives a service from the smart home cloud, network configuration and registration need to be first performed on the smart device. For example, after a user purchases a new smart device, before the smart device is used for the first time, network configuration and registration are first performed on the smart device.

In an example implementation, network configuration and registration are performed on the smart device by using a multicast network configuration solution.

After the smart device is started, the device can be discovered on a management unit. For example, the management unit is a management APP on a mobile phone, and the smart device is a smart socket. After the smart socket is powered on and started, the mobile phone may discover the smart socket (for example, the mobile phone and the smart socket discover each other through Bluetooth scanning). Refer to FIG. 6(*a*). The user may start the management APP on the mobile phone. The mobile phone displays an "add devices" interface of the management APP. An icon of the smart socket may be displayed on the "add devices" interface. The user may select to perform network configuration and registration on the smart socket by tapping a "connect" button 601. The mobile phone may receive a tap operation performed by the user on the "connect" button 601. As shown in FIG. 6(*b*), the mobile phone displays a "connect devices" interface 602 in response to the tap operation performed by the user on the "connect" button 601. The "connect devices" interface 602 includes a "network settings" interface 603, and the "network settings" interface 603 includes a "routers" option 604 and a "password" entry box 605. A default router SSID may be displayed in the "routers" option 604 (for example, the router is a router with strongest signal detected by the mobile phone), and the user may enter, in the "password" entry box 605, an access password corresponding to the router displayed in the "routers" option 604. The "connect devices" interface 602 further includes a "use other Wi-Fi" option 606. The user may select the "use other Wi-Fi" option 606 to change a router that the smart device accesses. The "connect devices" interface 602 further includes a "next" button 607, and the user may tap the "next" button 607, to determine to connect the smart socket to the router displayed in the "routers" option 604. Further, as shown in FIG. 6(*c*), the mobile phone displays a "connect devices" interface 608 in response to the operation of tapping the "next" button 607 by the user. The "connect devices" interface 608 may include display information 609 that is used to display progress of the smart socket accessing the router.

On another hand, the mobile phone may detect a network configuration and registration request of the smart device.

For example, if the mobile phone receives the tap operation performed by the user on the "connect" button 601 in FIG. 6(*a*), the mobile phone determines that the network configuration and registration request of the smart device is detected. For another example, if the mobile phone receives the operation of tapping the "next" button 607 by the user, the mobile phone determines that the network configuration and registration request of the smart device is detected. Optionally, if the mobile phone determines that the network configuration and registration request of the smart device is detected, the mobile phone obtains, from the smart home cloud, a parameter (for example, a security parameter) assigned by the smart home cloud to the smart device.

If the mobile phone detects an operation of the user determining to connect the smart device to the router (for example, detects the operation of tapping the "next" button 607 by the user), the mobile phone sends a probe request packet to the smart device. The packet includes a router identifier and a router access password of the router selected by the user, the parameter assigned by the smart home cloud to the smart device, and the like.

The smart device receives the probe request packet sent by the mobile phone and obtains the parameter in the packet. The smart device successfully accesses the router by using the obtained router identifier and router password, and sends a registration request to the smart home cloud. After receiving the registration request of the smart device, the smart home cloud assigns a unique device identifier to the smart device, and sends the device identifier to the smart device.

It may be understood that, in this embodiment, communication between the smart device and the smart home cloud may be relayed through the router. For example, that the smart device sends a registration request to the smart home cloud may be that the smart device sends the registration request to the smart home cloud through the router, and that the smart home cloud sends the device identifier to the smart device may be that the smart home cloud sends the device identifier to the smart device through the router.

The smart device receives the device identifier assigned by the smart home cloud, and the network configuration and registration process is completed.

The smart device may further synchronize progress of the network configuration and registration process to the mobile phone, and the mobile phone may refresh the display information 609 on the "connect devices" interface 608 shown in FIG. 6(*c*). For example, when the mobile phone determines that the network configuration process of the smart device is completed, the display information 609 is updated to "100%". Then, the mobile phone displays a main interface 610 of the management APP shown in FIG. 6(*d*), and the smart device completing the network configuration and registration and a running smart device are displayed on the main interface 610. For example, the user may set and manage the smart socket by tapping a "smart socket" icon on the main interface 610.

In this implementation, the network configuration and registration process of the smart device is triggered by the user on the management APP. In addition, the user needs to enter the router access password. An operation speed of the user affects the duration of the network configuration and registration process, and the network configuration and registration process is complex. On another hand, in this network configuration and registration manner, the mobile phone needs to support sending the probe request packet. If the mobile phone does not support sending the probe request packet, the smart device fails in network configuration and registration.

In an example implementation, network configuration and registration are performed on the smart device by using a SoftAP network configuration solution.

After being started, the smart device enters an access point (AP) mode. In AP mode, the smart device may function as an access hotspot for another device.

The user starts a management unit, and the smart device may be discovered on the management unit. For example, the management unit is a management APP on a mobile phone, and the smart device is a smart socket. Refer to FIG. 6(*a*) to FIG. 6(*d*). As described in the foregoing embodiment, the user may select, on the "network settings" interface 603 of the "connect devices" interface 602 shown in FIG. 6(*b*), the router that the smart device accesses. The "network settings" interface 603 includes the "routers" option 604 and the "password" entry box 605. The default router SSID may be displayed in the "routers" option 604 (for example, the router is a router with strongest signal strength detected by the mobile phone), and the user may enter, in the "password" entry box 605, the access password corresponding to the router displayed in the "routers" option 604. The "connect devices" interface 602 further includes the "next" button 607, and the user may tap the "next" button 607, to determine to connect the smart socket to the router displayed in the "routers" option 604.

If the mobile phone detects an operation of the user determining to connect the smart device to the router (for example, detects the operation of tapping the "next" button 607 by the user), the mobile phone sends parameters such as a router identifier and a router access password of the router selected by the user to the smart device.

The smart device receives the parameters such as the router identifier and the router access password sent by the mobile phone, successfully accesses the router by using the router identifier and the router password that are obtained from the mobile phone, and sends a registration request to the smart home cloud. After receiving the registration request of the smart device, the smart home cloud assigns a unique device identifier to the smart device, and sends the device identifier to the smart device. The smart device receives the device identifier assigned by the smart home cloud, and the network configuration and registration process is completed.

In this implementation, the network configuration and registration process of the smart device is triggered by the user on the management APP. In addition, the user needs to enter the router access password. An operation speed of the user affects the duration of the network configuration and registration process, and the network configuration and registration process is complex. Devices such as a first device and a second device in the following embodiments of this application may be the smart devices in the foregoing embodiments.

Figure 7:
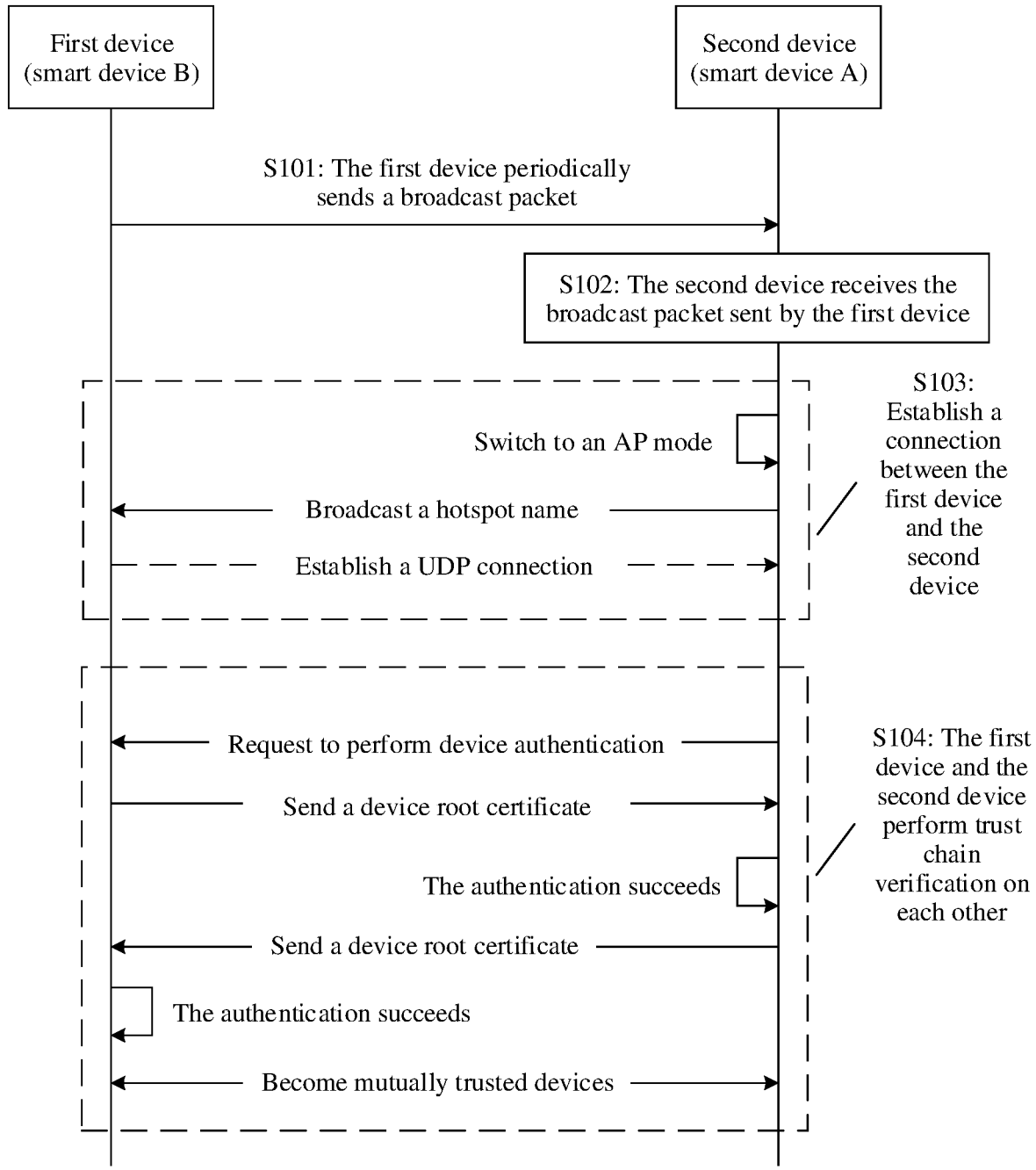
FIG. 7 is a schematic flowchart 1 of a device network configuration and registration method according to an embodiment of this application.

An embodiment of this application provides a device network configuration and registration method. As shown in FIG. 7, the method may include the following steps.

S101: A first device periodically sends a broadcast packet.

The first device is a smart device on which network configuration and registration need to be performed in a smart home system. For example, the first device is a smart device newly purchased by a user. For example, the smart home system is the system shown in FIG. 2, and the first device may be a smart device B in FIG. 2.

After being powered on, the first device periodically sends the broadcast packet, where the broadcast packet is used to request trust chain verification. For example, coverage of a router may be a trust chain. Smart devices on which trust chain verification succeeds belong to a same trust chain, and the smart devices that belong to the same trust chain can share a network configuration parameter. For example, the first device periodically sends a device SSID of the first device to the outside by using a beacon frame.

S102: A second device receives the broadcast packet sent by the first device.

The second device is one of smart devices that access the smart home system. After receiving the broadcast packet sent by the first device, the second device may perform trust chain verification with the first device. For example, the second device is a smart device A in FIG. 2.

Optionally, before trust chain verification is performed on the first device, it may be confirmed with the user, on a management unit, whether to perform network configuration and registration on the first device.

Figure 8A:
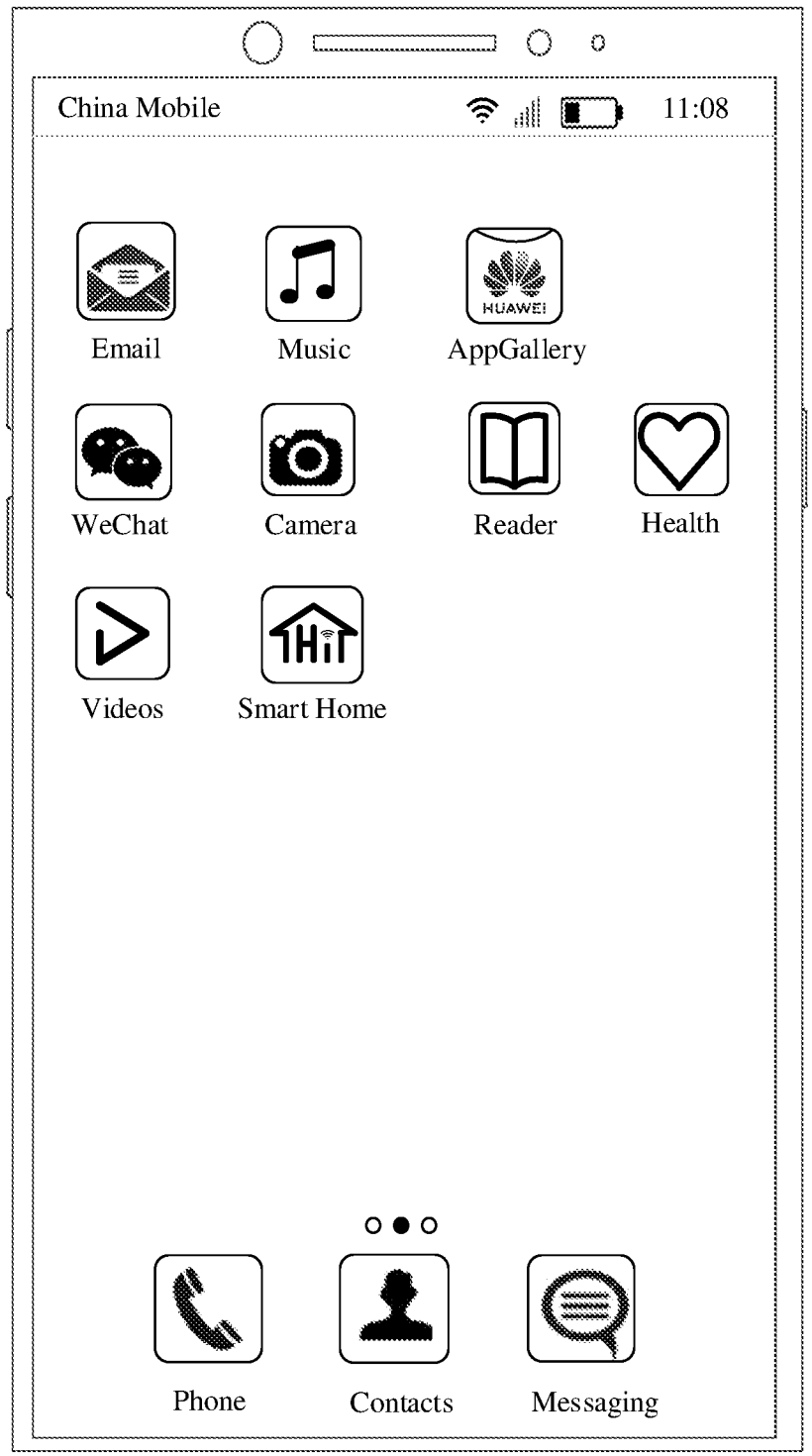
FIG. 8(a) to FIG. 8(f) are schematic diagrams 2 of a terminal display interface of a device network configuration and registration method according to an embodiment of this application.

For example, the management unit is a management APP on a mobile phone. As shown in FIG. 8(a), the management unit is a "smart home" APP on the mobile phone.

In an example implementation, the mobile phone receives the broadcast packet sent by the first device. The mobile phone displays a main interface of the management APP in response to receiving the broadcast packet sent by the first device.

In another example implementation, if the second device receives the broadcast packet sent by the first device, the second device sends a first message to the mobile phone. The first message is used to trigger, on the management unit, confirmation with the user about whether to perform network configuration and registration on the first device, and the first message may include information about one or more first devices. The mobile phone displays the main interface of the management APP in response to receiving the first message.

Figure 8B:
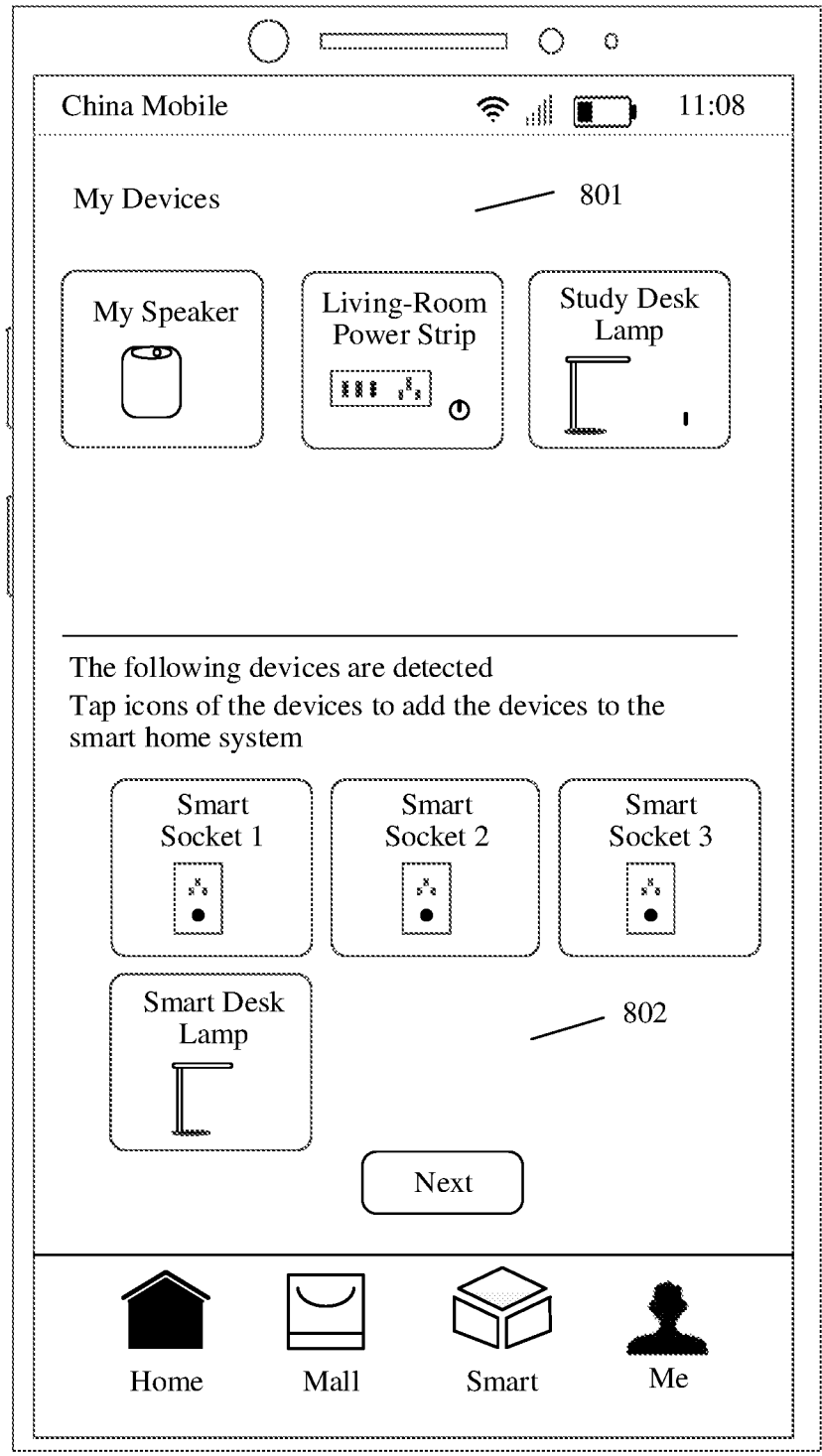

For example, FIG. 8(b) shows a main interface of the "smart home" APP.

The main interface may include a "my devices" interface 801, and the "my devices" interface 801 is used to display smart devices that access the smart home system. For example, as shown in FIG. 8(b), three devices that access the smart home system are displayed on the "my devices" interface 801: "my speaker", a "living-room power strip", and a "study desk lamp".

The main interface may further include a "devices to be added to the smart home system" interface 802, and the "devices to be added to the smart home system" interface 802 is used to display a smart device to be added to the smart home system, namely, the first device. Optionally, a plurality of first devices may be displayed on the "devices to be added to the smart home system" interface 802. For example, if the mobile phone receives broadcast packets sent by a plurality of first devices, the mobile phone displays the plurality of first devices on the "devices to be added to the smart home system" interface 802. For example, as shown in FIG. 8(b), four first devices are displayed on the "devices to be added to the smart home system" interface 802: a "smart socket 1", a "smart socket 2", a "smart socket 3", and a "smart desk lamp".

Figure 8C:
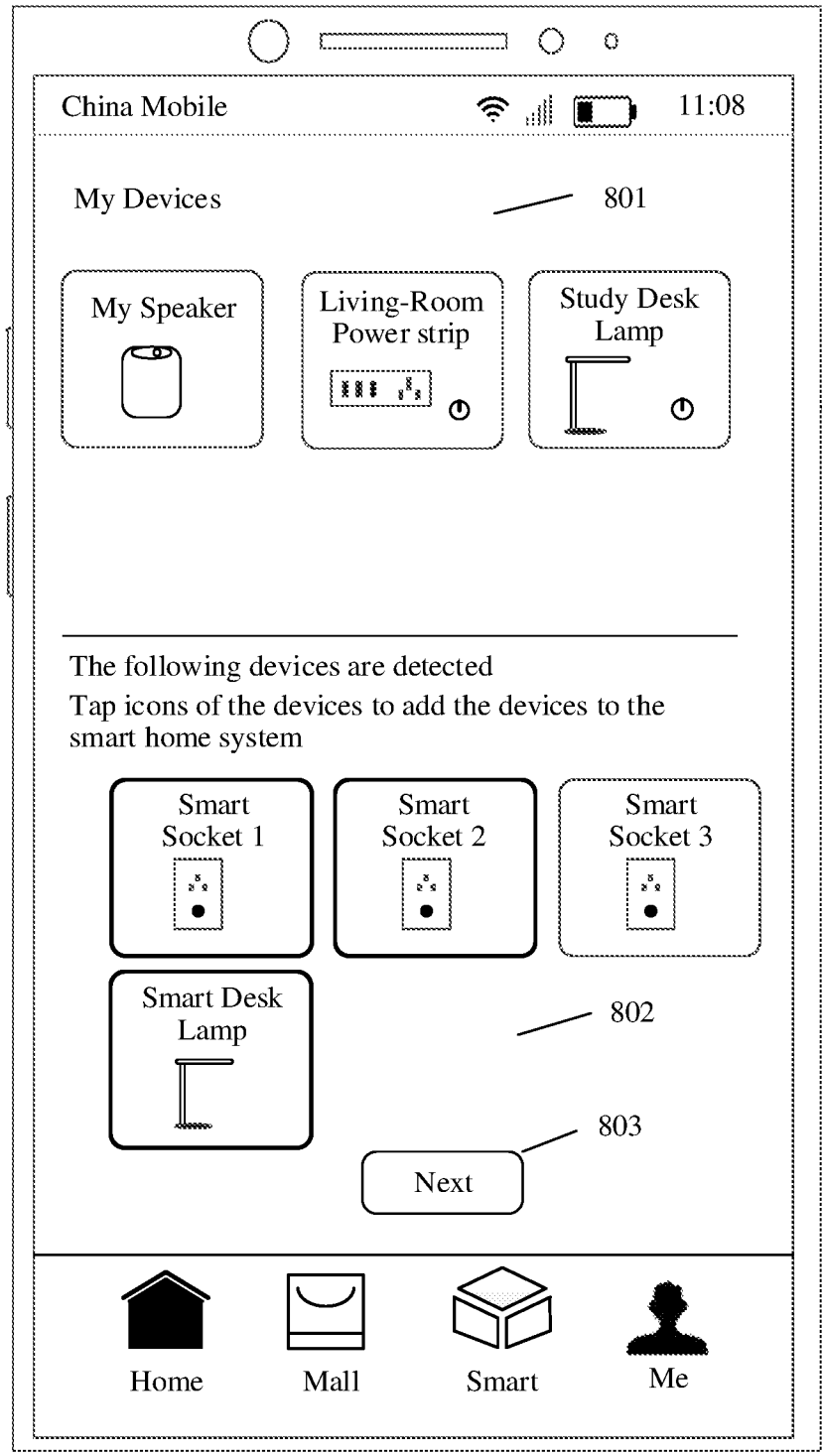

The user may select one or more first devices on the "devices to be added to the smart home system" interface 802 for network configuration and registration. For example, the user may select the first devices for network configuration and registration by tapping icons of the one or more first devices. For example, as shown in FIG. 8(c), the user selects the "smart socket 1", the "smart socket 2", and the "smart desk lamp" for network configuration and registration. The "devices to be added to the smart home system" interface 802 further includes a "next" button 803, and the user may tap the "next" button 803 to confirm to perform network configuration and registration on the selected one or more first devices. The mobile phone may detect a selection operation performed by the user on the icons of the one or more first devices and a tap operation performed by the user on the "next" button 803.

Figure 8D:
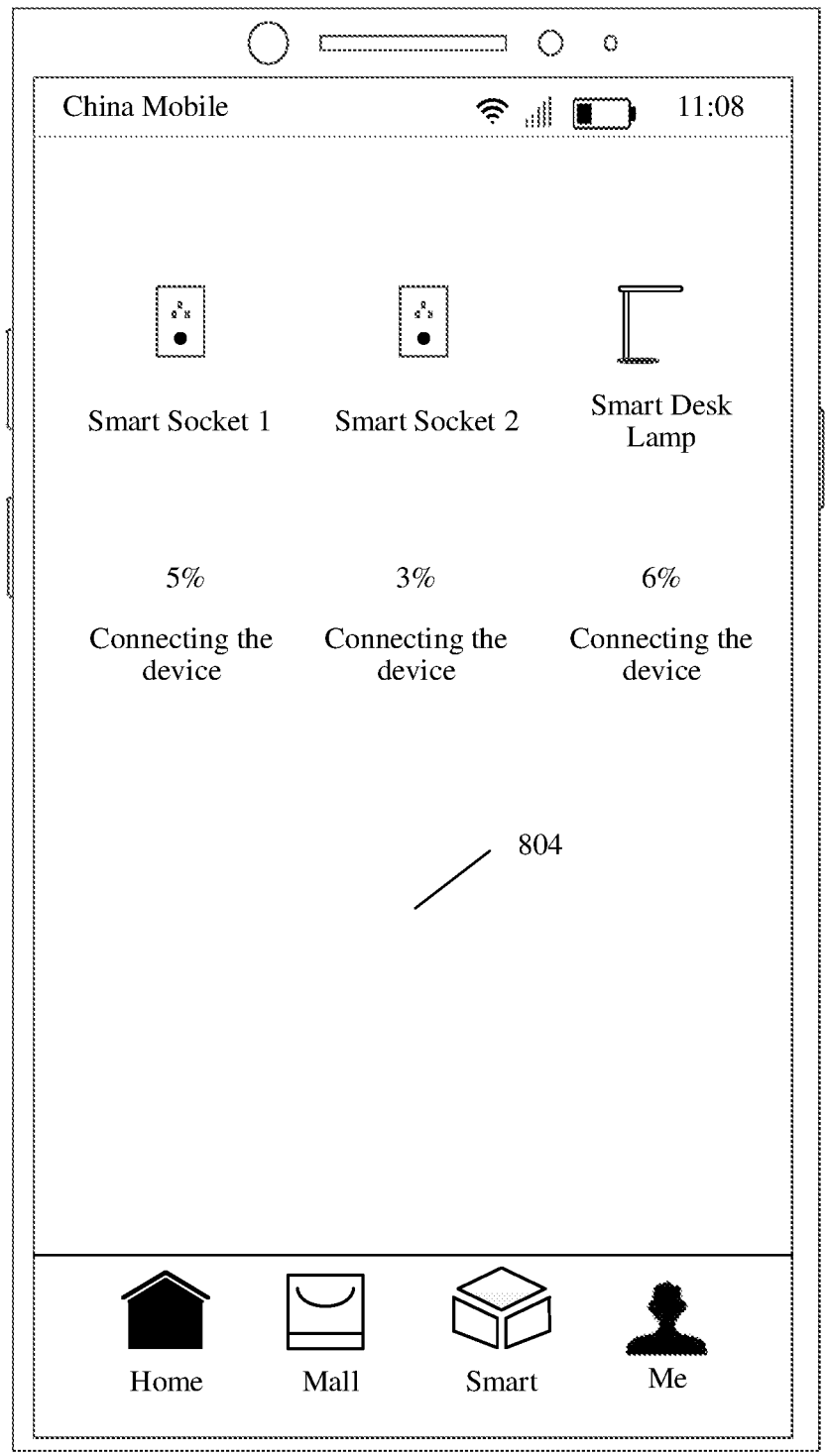

Optionally, the mobile phone may display a "device connection" interface 804 shown in FIG. 8(d) in response to the operation of confirming to perform network configuration and registration on the selected one or more first devices by the user (for example, the tap operation performed by the user on the "next" button 803). Progress of performing network configuration and registration on each first device may be displayed on the "device connection" interface 804.

In an example, the mobile phone sends a network configuration and registration confirmation message to the second device in response to the operation of confirming to perform network configuration and registration on the selected one or more first devices by the user (for example, the tap operation performed by the user on the "next" button 803). The message includes identifiers of the one or more first devices selected by the user. After receiving the network configuration and registration confirmation message, the second device starts to separately perform trust chain verification with the one or more first devices indicated by the identifiers of the one or more first devices in the network configuration and registration confirmation message.

Figure 8E:
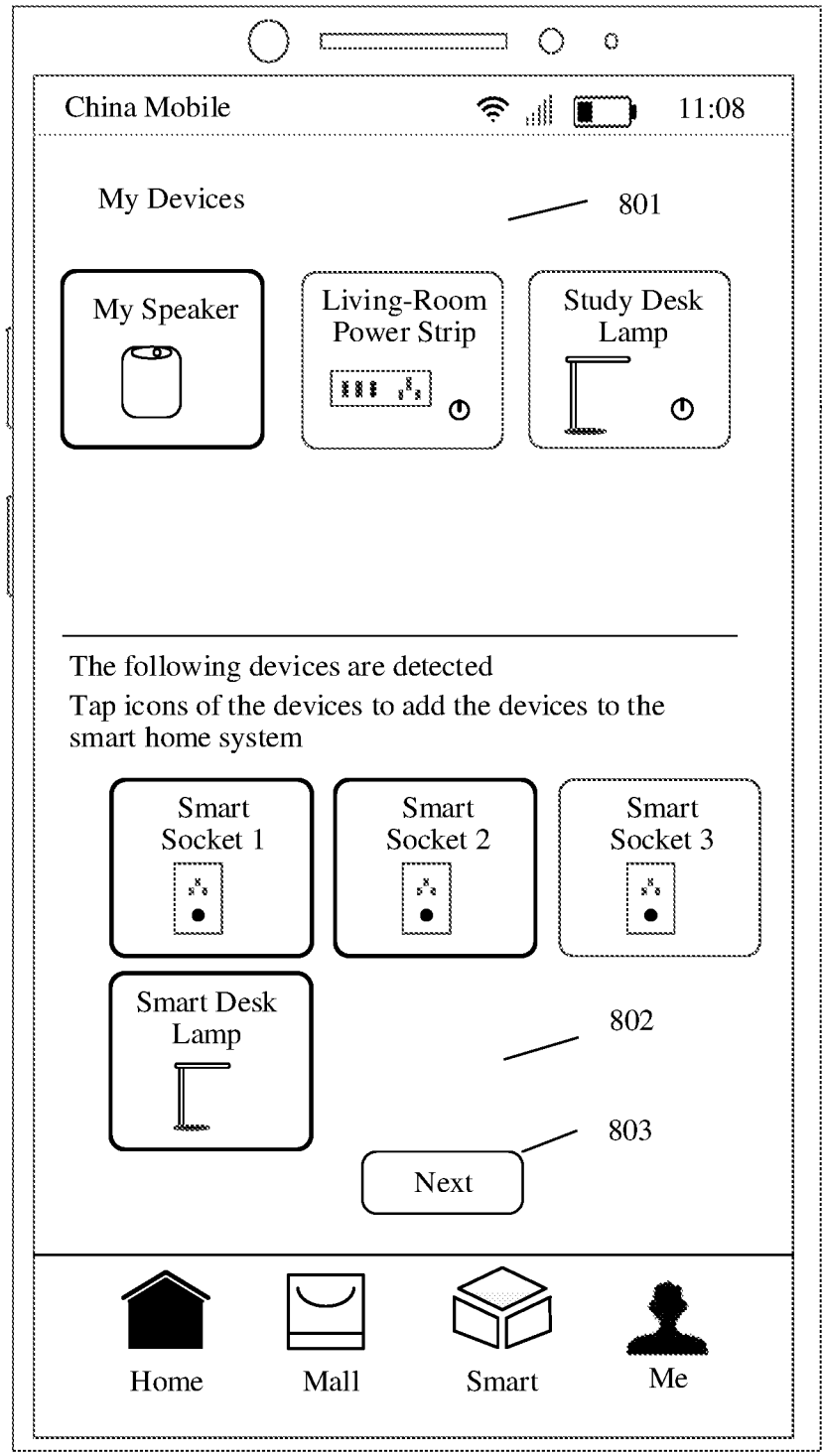

The second device may be any smart device that accesses the smart home system. For example, the second device may be a smart device, closest to the first device, in the smart devices that access the smart home system. For another example, the second device may be a smart device that is specified by the user and that accesses the smart home system. For example, as shown in FIG. 8(e), when selecting the one or more first devices on the "devices to be added to the smart home system" interface 802 for network configuration and registration, the user may select a smart device, on the "my devices" interface 801, that accesses the smart home system as the second device. For example, the user taps a "my speaker" icon on the "my devices" interface 801 to select "my speaker" as the second device.

In some embodiments, after receiving the broadcast packet sent by the first device, the second device may perform trust chain verification with the first device. In some other embodiments, after receiving the broadcast packet sent by the first device, and determining that the user confirms to perform network configuration and registration on the first device, the second device establishes a connection to the first device. In an implementation, if the second device receives the network configuration and registration confirmation message sent by the mobile phone, where the network configuration and registration confirmation message includes the identifier of the first device, the second device determines that the user confirms to perform network configuration and registration on the first device.

S103: Establish the connection between the first device and the second device.

A smart device may include a station mode and an AP mode. In the station mode, the smart device may function as a client to access an AP, and in the AP mode, the smart device may create an AP hotspot as an access hotspot for another device.

In some embodiments, the second device switches to the AP mode, and the first device is connected to an AP hotspot created by the second device. For example, the second device may invoke a Wi-Fi driver interface command to switch from the station mode to the AP mode, and broadcast a hotspot name of the second device. The first device is in the station mode, and when receiving the hotspot name of the second device that is sent by the second device in a broadcast manner, the first device is connected to the AP hotspot created by the second device.

In an implementation, a user datagram protocol (UDP) channel is established between the first device and the second device. The UDP channel may be used to transmit a certificate for trust chain verification.

S104: The first device and the second device perform trust chain verification on each other.

In an implementation, the first device and the second device perform trust chain verification on each other by using two-way authentication public key infrastructure (PM) device certificates.

For example, the second device requests the first device to perform device authentication. The first device sends a root certificate of the first device to the second device. After receiving the root certificate of the first device, the second device authenticates the root certificate, and if the authentication succeeds, the second device sends a root certificate of the second device to the first device. After receiving the root certificate of the second device, the first device authenticates the root certificate, and if the authentication succeeds, the two-way authentication between the first device and the second device succeeds.

Further, a secure data channel is established between the first device and the second device. In this way, trust chain verification performed by the first device and the second device on each other succeeds, the first device and the second device belong to a same trust chain, and the first device and the second device are mutually trusted devices.

Figure 9:
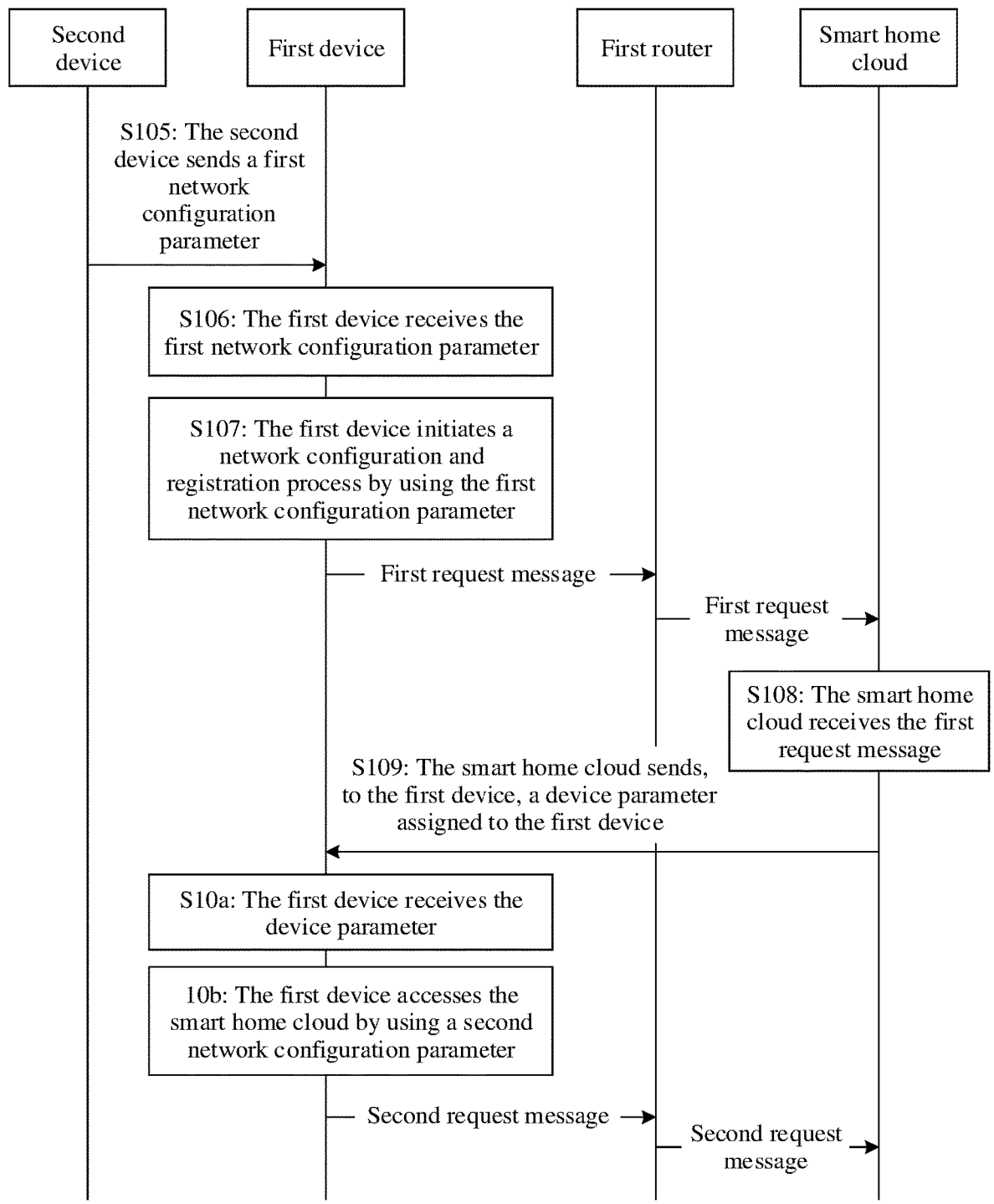
FIG. 9 is a schematic flowchart 2 of a device network configuration and registration method according to an embodiment of this application.

If the first device joins the same trust chain as the second device, network configuration and registration may further be performed on the first device. As shown in FIG. 9, after step S104, the device network configuration and registration method provided in this embodiment of this application may further include:

S105: The second device sends a first network configuration parameter.

The first network configuration parameter may include a local area network identifier (a router SSID) of a local area network, an access password of the local area network (an access password of a router), a first device identifier, a first security parameter, a first access token, and the like. The first device identifier is a device identifier assigned by a smart home cloud to the second device, the first security parameter is a security parameter (for example, a key) assigned by the smart home cloud to the second device, and the first access token is an access token assigned by the smart home cloud to the second device.

For example, after accessing the smart home system, the second device may store the network configuration parameter.

In an implementation, the second device generates a clone file based on the stored network configuration parameter. Optionally, the second device may encrypt the clone file when generating the clone file. The second device sends the clone file, and the clone file includes the first network configuration parameter. For example, the second device may send the clone file by using a UDP/TCP (transmission control protocol) packet.

In an implementation, after trust chain verification performed by the second device and one first device on each other succeeds, the second device sends the first network configuration parameter to the first device.

In another implementation, after trust chain verification performed by the second device and a plurality of first devices on each other succeeds, the second device sends the first network configuration parameter in a broadcasts or multicast manner. In this way, the plurality of first devices all may receive the first network configuration parameter.

S106: The first device receives the first network configuration parameter.

For example, the first device receives the clone file, and obtains the first network configuration parameter through decryption.

S107: The first device initiates a network configuration and registration process by using the first network configuration parameter.

The first device initiates the network configuration and registration process. In an implementation, the first device sends a first request message to the smart home cloud, where the first request message is used to request to access the smart home cloud. The first request message includes the first network configuration parameter and clone indication information, and the clone indication information is used to indicate that the first device requests to access the smart home cloud for the first time.

In an implementation, the first device sends the first request message to the smart home cloud through a first router. The first router is a router indicated by the router SSID in the first network configuration parameter, namely, a router that the second device accesses.

The first router receives the first request message, and obtains the router SSID and an access password of the first router based on the first network configuration parameter in the first request message. The first router establishes a connection (for example, a Wi-Fi connection) to the first device. In this way, the first device successfully accesses the first router, and the first device and the second device access a same router (the first router), that is, access a same local area network.

Then, the first router forwards the first request message to the smart home cloud.

S108: The smart home cloud receives the first request message.

The smart home cloud receives the first request message, and determines, based on the clone indication information in the first request message, that the first device requests to access the smart home cloud for the first time. The smart home cloud assigns a device parameter to the first device. The device parameter includes a second device identifier, a second security parameter, a second access token, and the like, the second device identifier is a device identifier assigned by the smart home cloud to the first device, the second security parameter is a security parameter (for example, a key) assigned by the smart home cloud to the first device, and the second access token is an access token assigned by the smart home cloud to the first device.

S109: The smart home cloud sends, to the first device, the device parameter assigned to the first device.

In an implementation, the smart home cloud sends, to the first device through the first router, the device parameter assigned to the first device.

S10*a*: The first device receives the device parameter.

For example, the first device receives the device parameter assigned by the smart home cloud, and may store the device parameter.

S10*b*: The first device accesses the smart home cloud by using a second network configuration parameter.

In an implementation, the first device sends a second request message to the smart home cloud, where the second request message is used to request to access the smart home cloud. The second request message includes the second network configuration parameter, and the second network configuration parameter includes the device parameter of the first device (for example, the second device identifier, the second security parameter, and the second access token).

In this way, the first device successfully accesses the smart home cloud, and the network configuration and registration process is completed.

Figure 10:
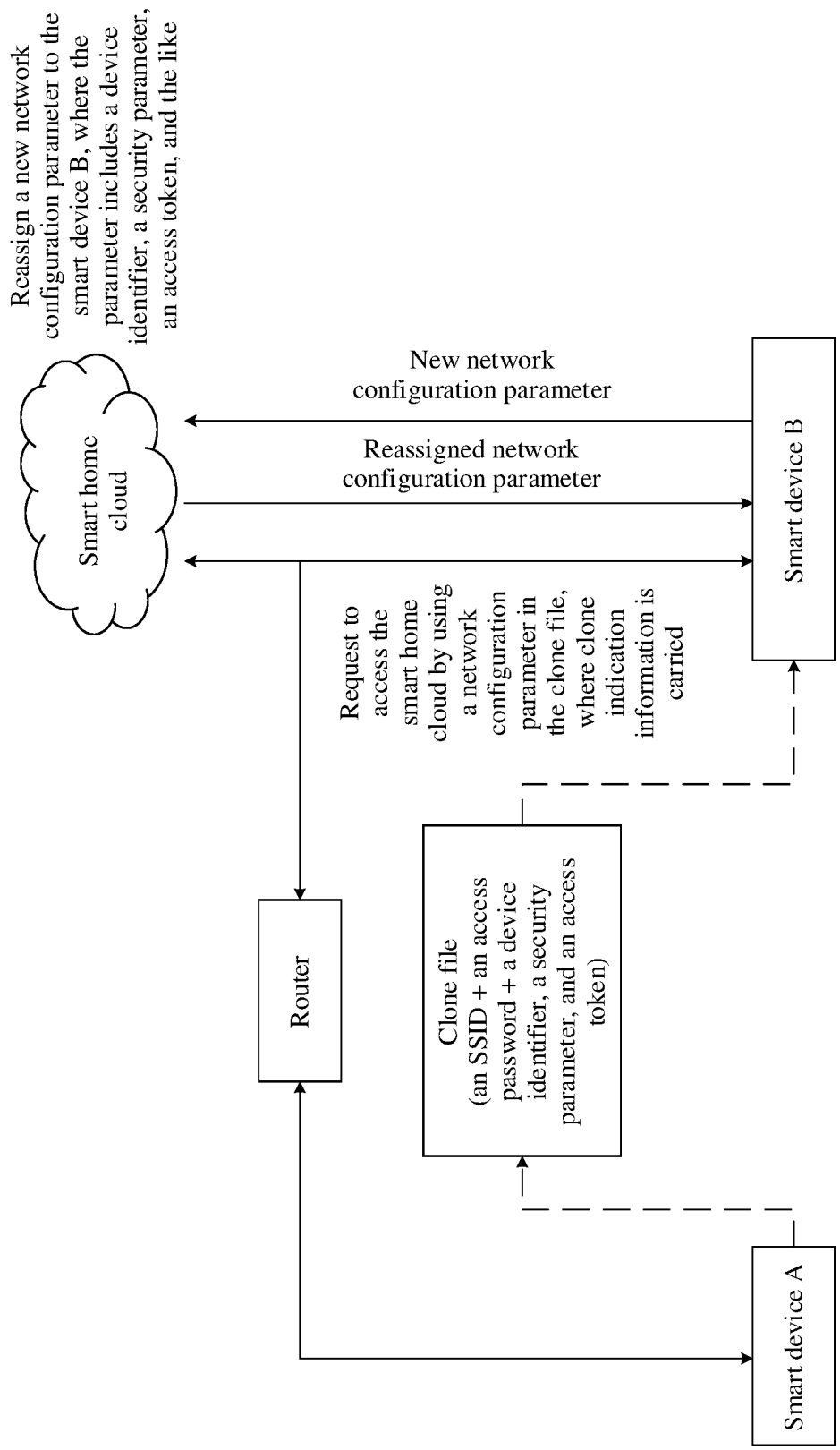
FIG. 10 is a schematic diagram of message interaction in a device network configuration and registration method according to an embodiment of this application.

Refer to FIG. 10. For example, the first device is the smart device B in FIG. 2, and the second device is the smart device A in FIG. 2.

The smart device A accesses the smart home system, and the smart device A stores a network configuration parameter including an SSID of a router that the smart device A accesses, an access password of the router, and a device identifier, a security parameter, and an access token that are assigned by the smart home cloud to the smart device A. The smart device A encrypts the stored network configuration parameter and generates a clone file.

After the smart device B completes trust chain verification with the smart device A, the smart device A sends the clone file to smart device B. After receiving the clone file, the smart device B obtains the network configuration parameter stored by the smart device A through decryption.

The smart device B requests to access the smart home cloud by using the network configuration parameters of the smart device A, where clone indication information is carried when the smart device B requests to access the smart home cloud. If trust chain verification performed on the smart device B and the smart device A succeeds, the smart device B accesses the router (a router L) that the smart device A accesses. The smart device B accesses the router L by using the router SSID and the router access password in the network configuration parameter of the smart device A. In addition, the smart device B requests access to the smart home cloud by forwarding the first request message through the router L.

If the smart home cloud receives the access request of the smart device B and obtains the clone indication information, the smart home cloud reassigns a new network configuration parameter to the smart device B. The new network configuration parameter includes a device identifier, a security parameter, an access token, and the like.

The smart device B receives the network configuration parameter reassigned by the smart home cloud, and re-requests to access the smart home cloud by using the new network configuration parameter. In this way, the smart device B completes a network configuration and registration process.

Figure 8F:
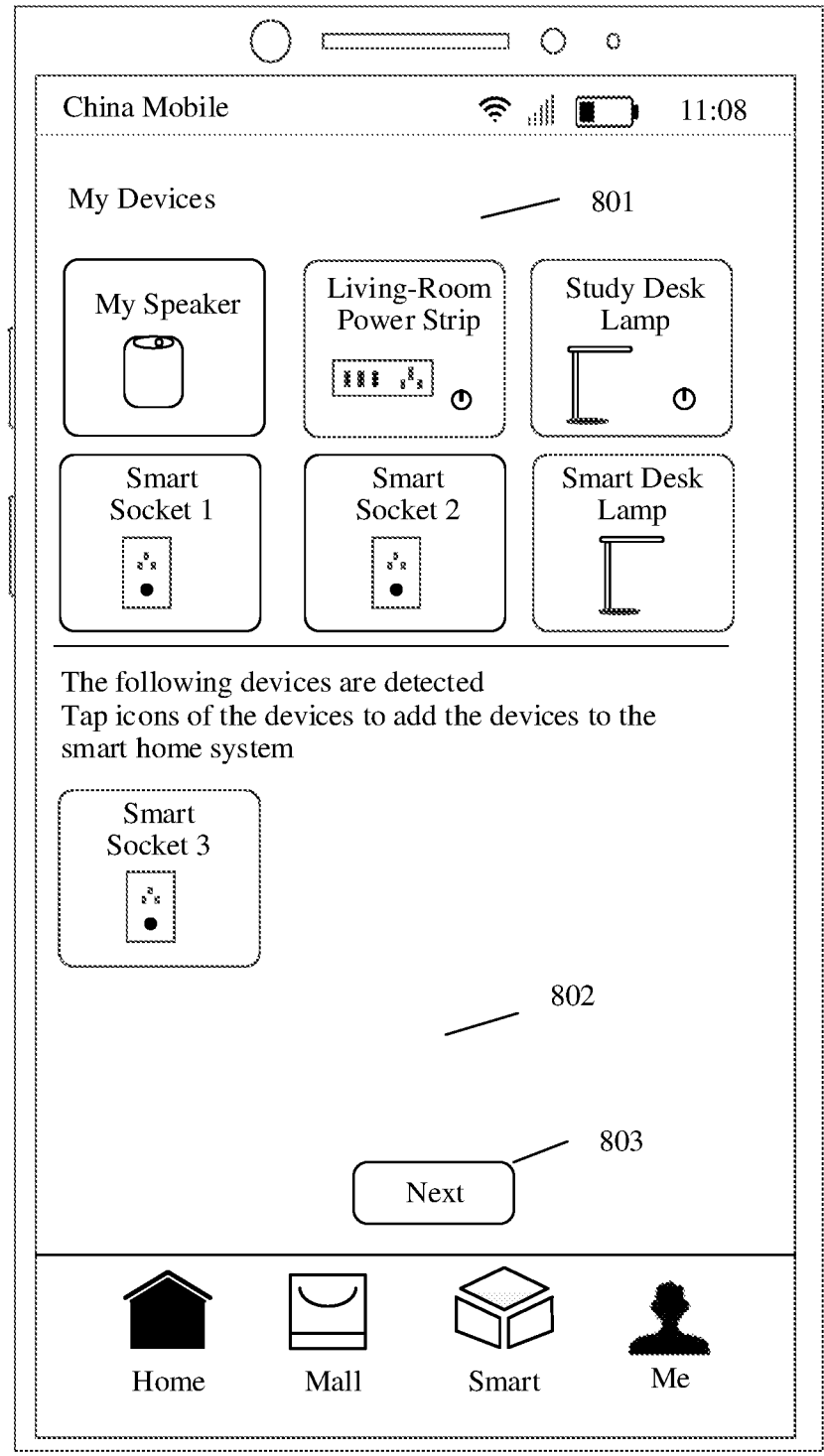

Optionally, after completing the network configuration and registration process, the smart device may update a status of the smart device on the management unit. For example, as shown in FIG. 8(f), after the "smart socket 1", the "smart socket 2", and the "smart desk lamp" complete network configuration and registration processes, icons of the "smart socket 1", the "smart socket 2", and the "smart desk lamp" may be displayed on the "my devices" interface 801.

According to the device network configuration and registration method provided in this embodiment of this application, network configuration and registration may be performed on a new smart device by using a network configuration parameter stored by a smart device that accesses the smart home system. The user does not need to manually enter the parameter in the network configuration and registration process. This simplifies the network configuration and registration process of the smart device. In addition, the device network configuration and registration method provided in this embodiment of can support batch network configuration and registration of the smart devices, and the user does not need to manually perform network configuration and registration on the smart devices one by one. This implements fast network configuration and registration of the smart device, and can effectively reduce a time for network configuration and registration of the smart device.

It may be understood that, to implement the foregoing functions, the smart device and the smart home cloud each include a corresponding hardware structure and/or software module for implementing each function. A person skilled in the art should be easily aware that, in combination with the examples described in the embodiments disclosed in this specification, units, algorithms, and steps may be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the smart device and the smart home cloud may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in this embodiment of this application, division into the modules is an example, and is merely a logical function division. In an actual implementation, another division manner may be used.

According to the device network configuration and registration method provided in this embodiment of this application, when performing the method, the smart device may be divided into a plurality of software modules. For example, the smart device may include modules such as a network configuration and registration module, an authentication module, a device cloning module, a configuration file transfer module, a device discovery module, and a network configuration information refreshing module.

Figure 11:
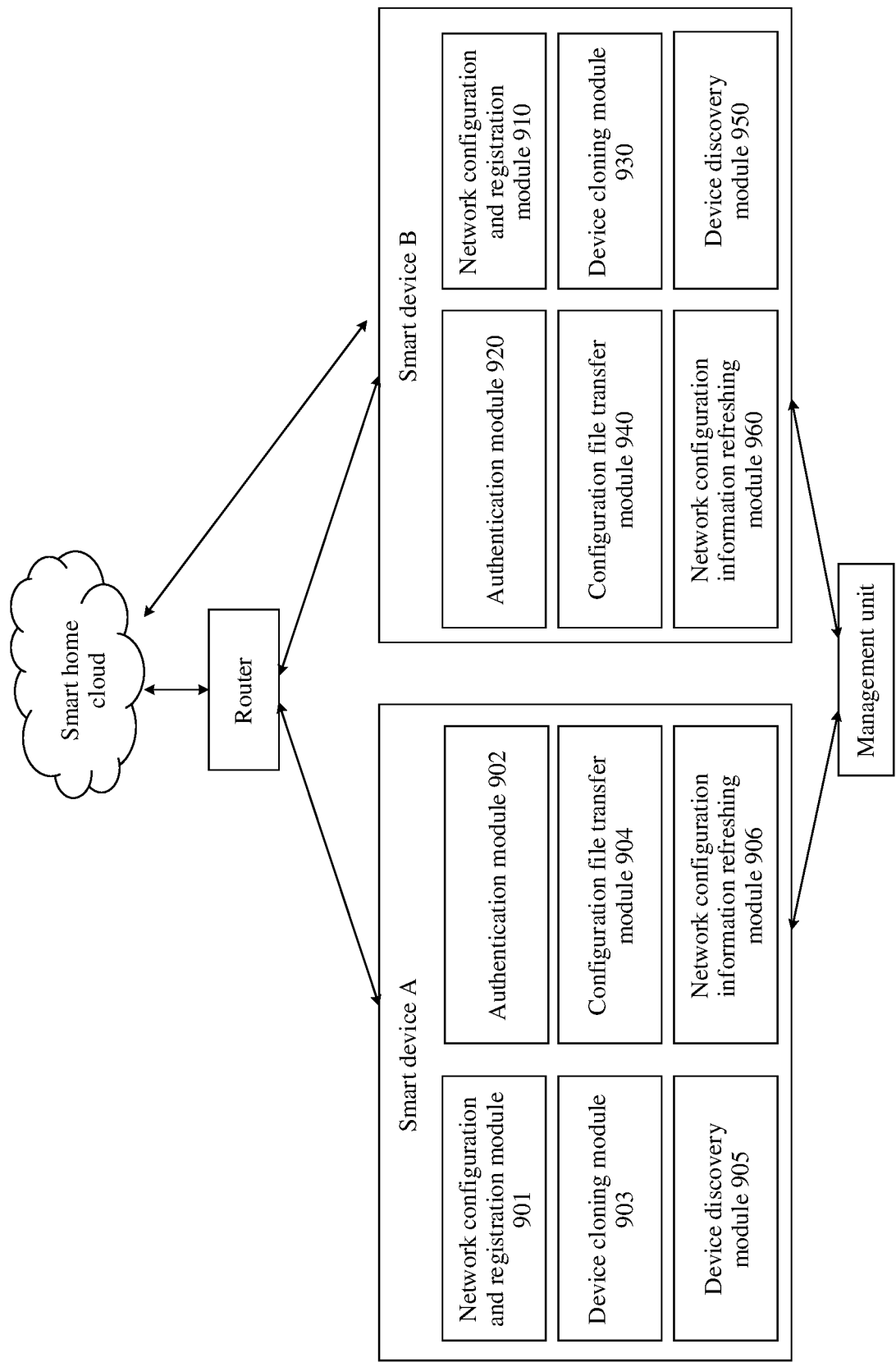
FIG. 11 is a schematic diagram of an architecture of a smart home system according to an embodiment of this application.

For example, the first device is a smart device B, and the second device is a smart device A. As shown in FIG. 11, the smart device A includes a network configuration and registration module 901, an authentication module 902, a device cloning module 903, a configuration file transfer module 904, a device discovery module 905, and a network configuration information refreshing module 906. The smart device B includes a network configuration and registration module 910, an authentication module 920, a device cloning module 930, a configuration file transfer module 940, a device discovery module 950, and a network configuration information refreshing module 960.

The network configuration and registration module may be used for interaction between a smart device and a smart home cloud in a network configuration and registration process. For example, the network configuration and registration module initiates the network configuration and registration process, obtains a device parameter from the smart home cloud, accesses the smart home cloud, and the like.

For example, the network configuration and registration module 910 of the smart device B may be configured to perform S107 in FIG. 9, to initiate the network configuration and registration process; may further be configured to perform S10a in FIG. 9, to obtain the device parameter from the smart home cloud; and may further be configured to perform S10b in FIG. 9, to access the smart home cloud.

The authentication module may be configured to perform trust chain verification between the smart devices. For example, the authentication module 902 of the smart device A and the authentication module 920 of the smart device B may be configured to perform S104 in FIG. 7, and the authentication module 902 is configured to interact with the authentication module 920, to perform trust chain verification between the smart device A and the smart device B.

The device cloning module may be configured to generate a clone file based on a stored network configuration parameter. For example, the device cloning module 903 of the smart device A may be configured to perform a step of generating the clone file of the network configuration parameter in S105 in FIG. 9.

The configuration file transfer module may be configured to transfer the network configuration parameter between the smart devices. For example, the configuration file transfer module 904 of the smart device A may be configured to perform a step of sending the first network configuration parameter in S105 in FIG. 9. The configuration file transfer module 940 of the smart device B may be configured to perform a step of receiving the first network configuration parameter in S106 in FIG. 9.

The device discovery module may be configured to trigger to discover the smart device on a management unit, for example, trigger to confirm, with a user, whether to perform network configuration and registration on the first device.

The network configuration information refreshing module may be configured to update and store a device parameter assigned by the smart home cloud to the smart device. For example, the network configuration information refreshing module 960 of the smart device B may be configured to perform a step of storing the device parameter assigned by the smart home cloud in S10a in FIG. 9.

Figure 12:
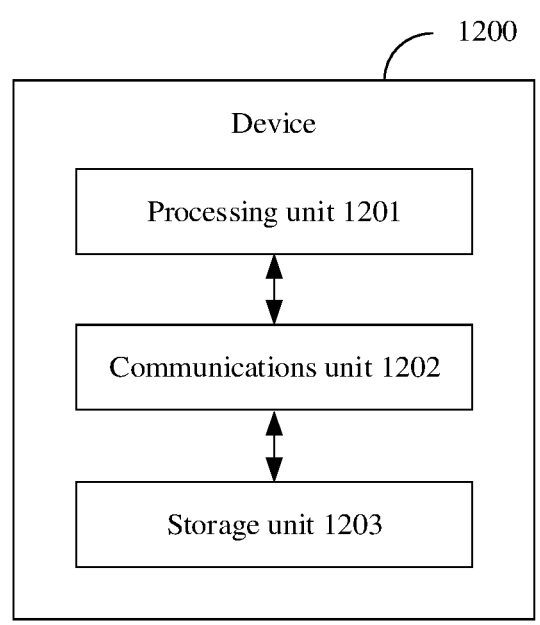
FIG. 12 is a schematic diagram of a structure of a smart device according to an embodiment of this application.

When an integrated unit is used, FIG. 12 is a schematic diagram of a possible structure of the smart device in the foregoing embodiments. A smart device 1200 includes a processing unit 1201, a communications unit 1202, and a storage unit 1203. The processing unit 1201 is configured to control and manage an action of the smart device 1200, the communications unit 1202 is configured to support communication between the smart device 1200 and another network entity, and the storage unit 1203 stores instructions and data of the smart device 1200. The instructions may be used to perform steps in FIG. 7, FIG. 9, and corresponding embodiments.

Certainly, unit modules in the smart device 1200 include but are not limited to the processing unit 1201, the communications unit 1202, and the storage unit 1203. For example, the smart device 1200 may further include a power supply unit and the like, where the power supply unit is configured to supply power to the smart device 1200.

The processing unit 1201 may be a processor or a controller, for example, may be a central processing unit (CPU), a digital signal processor (DSP), or an application-specific integrated circuit (ASIC), a field programmable gate array (FPGA) or another programmable logic component, a transistor logic component, a hardware component, or any combination thereof. The communications unit 1202 may be a transceiver, a transceiver circuit, or the like. The storage unit 1203 may be a memory.

For example, the processing unit 1201 is a processor (the processor 110 shown in FIG. 3), the communications unit 1202 may be referred to as a communications interface, and includes a wireless communications module (the wireless communications module 130 shown in FIG. 3), and the storage unit 1203 may be a memory (the memory 120 shown in FIG. 3). The smart device 1200 provided in this embodiment may be the smart device 100 shown in FIG. 3. The processor, the memory, the communications interface, and the like may be connected together, for example, connected through a bus.

An embodiment of this application further provides a computer storage medium. The computer storage medium stores computer program code, and when the processor executes the computer program code, the smart device performs the method in the foregoing embodiments.

An embodiment of this application further provides a computer program product. When the computer program product runs on a computer, the computer is enabled to perform the method in the foregoing embodiments.

The smart device 1200, the computer storage medium, and the computer program product provided in the embodiments of this application each are configured to perform the corresponding method provided above. Therefore, for beneficial effects that can be achieved by the smart device 1200, the computer storage medium, and the computer program product, refer to the beneficial effects in the corresponding methods provided above.

The foregoing descriptions about the implementations allow a person skilled in the art to clearly understand that, for the purpose of convenient and brief description, division into only the foregoing function modules is used as an example for description. In actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatuses and methods may be implemented in other manners. For example, the described apparatus embodiments are merely examples. For example, division into the modules or units is merely logical function division, and may be other division in an actual implementation. For example, a plurality of units or components may be combined or may be integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in a form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods in the embodiments of this application. The foregoing storage medium includes any medium that can store program code, such as a USB flash drive, a removable hard disk, a ROM, a magnetic disk, or an optical disc.

The foregoing descriptions are merely non-limiting examples of specific implementations of the present disclosure, but are not intended to limit the protection scope, which is intended to cover any variation or replacement readily determined by a person skilled in the art.

Therefore, the claims shall define the protection scope.

What is claimed is:

1. A device network configuration and registration method performed by a first device, wherein the first device is to be registered into a local area network including a server, and the method comprises:
   receiving, by the first device, a first network configuration parameter of a second device from the second device, wherein the second device has registered into the local area network, the first network configuration parameter comprises a local area network identifier of the local area network, an access password of the local area network, and one or more first device parameters of the second device, the one or more first device parameters including a device identifier of the second device, a security parameter of the second device, and/or an access token of the second device;
   accessing, by the first device, the local area network indicated by the local area network identifier by using the access password of the local area network;
   requesting, by the first device, to access the server by using the first network configuration parameter of the second device;
   receiving, by the first device, a second device parameters assigned by the server to the first device, wherein the second device parameters comprise a device identifier of the first device, a security parameter of the first device, and an access token of the first device; and
   requesting, by the first device, to access the server by using a second network configuration parameter, wherein the second network configuration parameter comprises the second device parameters of the first device.

2. The method according to claim 1, further comprising, before receiving the first network configuration parameter of second from the second device, performing, by the first device, trust chain verification with the second device.

3. The method according to claim 2, wherein performing the trust chain verification with the second device comprises:
   sending, by the first device, a public key infrastructure (PKI) device certificate of the first device to the second device;
   receiving, by the first device, a PKI device certificate of the second device; and
   performing, by the first device, the trust chain verification on the second device by authenticating the PKI device certificate of the second device.

4. The method according to claim 2, further comprising, before performing the trust chain verification with the second device, establishing, by the first device, a connection to the second device.

5. The method according to claim 1, wherein requesting to access the server by using the first network configuration parameter comprises:
   sending, by the first device, a first request message to the server, wherein the first request message requests to access the server, and the first request message comprises the first network configuration parameter.

6. The method according to claim 5, wherein the first request message further comprises clone indication information indicating that the first device requests to access the server for a first time.

7. A first device, comprising at least one processor and a memory storing instructions that, when executed by the at least one processor, cause the first device to perform operations comprising:
   receiving a first network configuration parameter of a second device from the second device, wherein the first device is to be registered into a local area network including a server, the second device has registered into the local area network, the first network configuration parameter of the second device comprises a local area network identifier of the local area network, an access password of the local area network, and one or more first device parameters of the second device, the one or more first device parameters including a device identifier of the second device, a security parameter of the second device, and/or an access token of the second device;
   accessing the local area network indicated by the local area network identifier by using the access password of the local area network;
   requesting to access the server by using the first network configuration parameter of the second device;
   receiving a second device parameters assigned by the server to the first device, wherein the second device parameter comprise a device identifier of the first device, a security parameter of the first device, and an access token of the first device; and
   requesting to access the server by using a second network configuration parameter, wherein the second network configuration parameter comprises the second device parameters of the first device.

8. The first device according to claim 7, wherein the operations further comprise, before receiving the first network configuration parameter from the second device, performing trust chain verification with the second device.

9. The first device according to claim 8, wherein performing the trust chain verification with the second device comprises:
   sending a public key infrastructure (PKI) device certificate of the first device to the second device;
   receiving a PKI device certificate of the second device; and
   performing the trust chain verification on the second device by authenticating the PKI device certificate of the second device.

10. The first device according to claim 8, wherein the operations further comprise, before performing the trust chain verification with the second device, establishing a connection to the second device.

11. The first device according to claim 7, wherein requesting to access the server by using the first network configuration parameter comprises:

sending a first request message to the server, wherein the first request message requests to access the server, and the first request message comprises the first network configuration parameter.

12. The first device according to claim 11, wherein the first request message further comprises clone indication information indicating that the first device requests to access the server for a first time.

13. The first device according to claim 7, wherein the second device accesses the local area network identified by the local area network identifier.

14. The first device according to claim 7, wherein the second device accesses the server.

15. A system, comprising a first device, and a second device, wherein the second device is to be registered into a local area network including a server; the first device has registered into the local area network to access the server; the first device includes at least one processor configured to:
receive an operation of confirming to perform network configuration and registration on the second device by a user; and
send a first network configuration parameter of the first device to the second device, wherein the first network configuration parameter comprises a local area network identifier of the local area network, an access password of the local area network, and one or more first device parameters of the first device, the one or more first device parameters including a device identifier of the first device, a security parameter of the first device, and/or an access token of the first device, and
the second device includes at least one processor configured to:
receive the first network configuration parameter of the first device;
access, by using the access password of the local area network, the local area network indicated by the local area network identifier, wherein the first device accesses the local area network indicated by the local area network identifier;
request to access the server by using the first network configuration parameter of the first device;
receive one or more second device parameters assigned by the server to the second device, wherein the one or more second device parameters comprise a device identifier of the second device, a security parameter of the second device, and/or an access token of the second device; and
request to access the server by using the one or more second device parameters of the second device.

16. The system according to claim 15, wherein the at least one processor of the first device is further configured to: perform trust chain verification with the second device in response to the operation of confirming to perform network configuration and registration on the second device by the user.

17. The system according to claim 16, wherein the at least one processor of the first device is further configured to:
receive a public key infrastructure (PKI) device certificate of the second device;
perform trust chain verification on the second device by authenticating the PKI device certificate of the second device; and
send a PKI device certificate of the first device to the second device.

18. The system according to claim 16, wherein the at least one processor of the second device is further configured to, before performing the trust chain verification with the first device, establish a connection to the first device.

19. The system according to claim 15, wherein requesting to access the server by using the first network configuration parameter comprises:
sending a first request message to the server, wherein the first request message requests to access the server, and the first request message comprises the first network configuration parameter.

20. The system according to claim 19, wherein
the first request message further comprises clone indication information indicating that the second device requests to access the server for a first time.

* * * * *

UNITED STATES PATENT AND TRADEMARK OFFICE
CERTIFICATE OF CORRECTION

| | |
|---|---|
| PATENT NO. | : 11,895,494 B2 |
| APPLICATION NO. | : 17/631053 |
| DATED | : February 6, 2024 |
| INVENTOR(S) | : Tianliang Xu |

Page 1 of 1

It is certified that error appears in the above-identified patent and that said Letters Patent is hereby corrected as shown below:

In the Specification

Column 2, Line 33, change "(PM)" to --(PKI)--;

Column 2, Line 36, change "PM" to --PKI--;

Column 19, Line 15, change "(PM)" to --(PKI)--;

In the Claims

Column 25, Claim 2, Line 3, change "second from the second device" should be --the second device from the second device--;

Column 26, Claim 7, Line 23, change "receiving a second device parameters" to --receiving second device parameters--; and Column 26, Claim 7, Line 25, change "parameter comprise" to --parameters comprise--.

Signed and Sealed this
Twenty-seventh Day of August, 2024

Katherine Kelly Vidal
*Director of the United States Patent and Trademark Office*